United States Patent
Barckholtz et al.

(10) Patent No.: US 11,211,621 B2
(45) Date of Patent: Dec. 28, 2021

(54) REGENERATION OF MOLTEN CARBONATE FUEL CELLS FOR DEEP $CO_2$ CAPTURE

(71) Applicants: EXXONMOBIL RESEARCH AND ENGINEERING COMPANY, Annandale, NJ (US); FUELCELL ENERGY, INC., Danbury, CT (US)

(72) Inventors: Timothy A. Barckholtz, Whitehouse Station, NJ (US); Jonathan Rosen, Morristown, NJ (US); Carla S. Pereira, Bridgewater, NJ (US); Rodrigo F. Blanco Gutierrez, Berkeley Heights, NJ (US); Frank Hershkowitz, Basking Ridge, NJ (US); Carl A. Willman, Newtown, CT (US); Timothy C. Geary, Stamford, CT (US)

(73) Assignees: EXXONMOBIL RESEARCH AND ENGINEERING COMPANY, Annandale, NJ (US); FUELCELL ENERGY, INC., Danbury, CT (US)

( * ) Notice: Subject to any disclaimer, the term of this patent is extended or adjusted under 35 U.S.C. 154(b) by 0 days.

(21) Appl. No.: 16/695,335

(22) Filed: Nov. 26, 2019

(65) Prior Publication Data
US 2020/0176793 A1 Jun. 4, 2020

Related U.S. Application Data

(60) Provisional application No. 62/773,408, filed on Nov. 30, 2018.

(51) Int. Cl.
*H01M 8/04537* (2016.01)
*H01M 8/0438* (2016.01)
*H01M 8/14* (2006.01)

(52) U.S. Cl.
CPC ... *H01M 8/04582* (2013.01); *H01M 8/04395* (2013.01); *H01M 8/145* (2013.01); *H01M 2008/147* (2013.01)

(58) Field of Classification Search
CPC ......... H01M 8/04179; H01M 8/04388; H01M 8/04395; H01M 8/04402; H01M 8/0441;
(Continued)

(56) References Cited

U.S. PATENT DOCUMENTS 3,615,839 A 10/1971 Thompson et al.
3,970,474 A 7/1976 Anbar et al.
(Continued)

FOREIGN PATENT DOCUMENTS

CA 2120858 A1 10/1994
CA 2325072 A1 4/2002
(Continued)

OTHER PUBLICATIONS

Campanari et al., "Using MCFC for high efficiency CO2 capture from natural gas combined cycles: Comparison of internal and external reforming," Feb. 20, 2013, Applied Energy, 112, 772-783. (Year: 2013).*
(Continued)

*Primary Examiner* — Ula C Ruddock
*Assistant Examiner* — Matthew W Van Oudenaren
(74) *Attorney, Agent, or Firm* — Shook Hardy & Bacon LLP

(57) ABSTRACT

Systems and methods are provided for operating molten carbonate fuel cells to allow for periodic regeneration of the fuel cells while performing elevated $CO_2$ capture. In some aspects, periodic regeneration can be achieved by shifting the location within the fuel cells where the highest density of alternative ion transport is occurring. Such a shift can result in a new location having a highest density of alter-
(Continued)

native ion transport, while the previous location can primarily transport carbonate ions. Additionally or alternatively, periodic regeneration can be performed by modifying the input flows to the fuel cell and/or relaxing the operating conditions of the fuel cell to reduce or minimize the amount of alternative ion transport.

14 Claims, 8 Drawing Sheets

(58) Field of Classification Search
CPC ......... H01M 8/04447; H01M 8/04455; H01M 8/04462; H01M 8/04477; H01M 8/04798; H01M 8/04805; H01M 8/04761; H01M 8/04753; H01M 8/145; H01M 8/14; H01M 2008/147; H01M 2300/0051
See application file for complete search history.

(56) References Cited

U.S. PATENT DOCUMENTS

| | | |
|---|---|---|
| 4,041,210 A | 8/1977 | Van Dine |
| 4,160,663 A | 7/1979 | Hsieh |
| 4,772,634 A | 9/1988 | Farooque |
| 4,800,052 A | 1/1989 | Swarr et al. |
| 4,810,595 A | 3/1989 | Kahara et al. |
| 4,917,971 A | 4/1990 | Farooque |
| 4,921,765 A | 5/1990 | Gmeindl et al. |
| 4,995,807 A | 2/1991 | Rampley et al. |
| 5,039,579 A | 8/1991 | Kinoshita |
| 5,071,719 A | 12/1991 | Rostrup-Nielsen et al. |
| 5,079,103 A | 1/1992 | Schramm |
| 5,082,752 A | 1/1992 | Koga et al. |
| 5,084,362 A | 1/1992 | Farooque |
| 5,134,043 A | 7/1992 | Nakazawa |
| 5,169,717 A | 12/1992 | Topsoe |
| 5,198,311 A | 3/1993 | Nakazawa et al. |
| 5,208,113 A | 5/1993 | Kinoshita |
| 5,232,793 A | 8/1993 | Miyauchi et al. |
| 5,376,472 A | 12/1994 | Hartvigsen et al. |
| 5,380,600 A | 1/1995 | Hansen et al. |
| 5,413,878 A | 5/1995 | Williams et al. |
| 5,417,051 A | 5/1995 | Ankersmit et al. |
| 5,422,195 A | 6/1995 | Bernard |
| 5,468,573 A | 11/1995 | Bregoli et al. |
| 5,470,670 A | 11/1995 | Yasumoto et al. |
| 5,518,827 A | 5/1996 | Matsumura et al. |
| 5,541,014 A | 7/1996 | Micheli et al. |
| 5,554,453 A | 9/1996 | Steinfeld et al. |
| 5,616,430 A | 4/1997 | Aoyama |
| 5,688,292 A | 11/1997 | Antolini |
| 5,736,026 A | 4/1998 | Patel et al. |
| 5,833,734 A | 11/1998 | Cip et al. |
| 6,030,718 A | 2/2000 | Fuglevand et al. |
| 6,063,141 A | 5/2000 | Wendt et al. |
| 6,083,636 A | 7/2000 | Hsu |
| 6,090,312 A | 7/2000 | Ziaka et al. |
| 6,126,718 A | 10/2000 | Sawa et al. |
| 6,162,556 A | 12/2000 | Vollmar et al. |
| 6,267,799 B1 | 7/2001 | Innes et al. |
| 6,322,916 B1 | 11/2001 | Hemmes et al. |
| 6,365,290 B1 | 4/2002 | Ghezel-Ayagh et al. |
| 6,383,251 B1 | 5/2002 | Sherwood |
| 6,383,677 B1 | 5/2002 | Allen |
| 6,420,062 B1 | 7/2002 | Prohaska et al. |
| 6,492,045 B1 | 12/2002 | Blanchet et al. |
| 6,509,113 B2 | 1/2003 | Keegan |
| 6,524,356 B2 | 2/2003 | Fournier et al. |
| 6,648,942 B2 | 11/2003 | Hoffman et al. |
| 6,896,988 B2 | 5/2005 | Wang et al. |
| 7,311,986 B2 | 12/2007 | Hsu |
| 7,396,603 B2 | 7/2008 | Farooque et al. |
| 7,503,178 B2 | 3/2009 | Bucker et al. |
| 7,563,527 B2 | 7/2009 | Tanaka et al. |
| 7,862,938 B2 | 1/2011 | Ghezel-Ayagh |
| 7,914,765 B2 | 3/2011 | McLean et al. |
| 7,939,219 B2 | 5/2011 | Johnsen et al. |
| 8,047,007 B2 | 11/2011 | Zubrin et al. |
| 8,080,344 B2 | 12/2011 | Skok et al. |
| 8,142,943 B2 | 3/2012 | McElroy et al. |
| 8,349,504 B1 | 1/2013 | Radovich |
| 8,557,468 B2 | 10/2013 | Hilmi et al. |
| 8,562,903 B2 | 10/2013 | Hayton et al. |
| 8,802,332 B2 | 8/2014 | Correa et al. |
| 8,822,090 B2 | 9/2014 | Ma et al. |
| 9,077,007 B2 | 7/2015 | Berlowitz et al. |
| 2002/0106549 A1 | 8/2002 | Cooper et al. |
| 2002/0142208 A1 | 10/2002 | Keefer et al. |
| 2003/0008183 A1 | 1/2003 | Hsu |
| 2003/0096155 A1 | 5/2003 | Hong et al. |
| 2003/0143448 A1 | 7/2003 | Keefer |
| 2004/0038089 A1 | 2/2004 | Hoffjann et al. |
| 2004/0038115 A1 | 2/2004 | Johnsen et al. |
| 2004/0043274 A1 | 3/2004 | Scartozzi et al. |
| 2004/0202914 A1 | 10/2004 | Sridhar et al. |
| 2005/0079395 A1 | 4/2005 | Varatharajan et al. |
| 2005/0106429 A1 | 5/2005 | Keefer |
| 2005/0112425 A1 | 5/2005 | Hsu |
| 2005/0123810 A1 | 6/2005 | Balan |
| 2005/0164051 A1 | 7/2005 | Venkataraman et al. |
| 2005/0181247 A1 | 8/2005 | Foger et al. |
| 2006/0127718 A1 | 6/2006 | Kurashima et al. |
| 2006/0159967 A1 | 7/2006 | Huijsmans et al. |
| 2006/0204806 A1 | 9/2006 | Takada et al. |
| 2006/0251940 A1 | 11/2006 | Bandhauer et al. |
| 2006/0269830 A1* | 11/2006 | Johnsen ............ H01M 8/144 429/442 |
| 2007/0017367 A1 | 1/2007 | McElroy et al. |
| 2007/0072027 A1 | 3/2007 | Sridhar et al. |
| 2007/0099038 A1 | 5/2007 | Galloway |
| 2007/0184310 A1 | 8/2007 | Kim et al. |
| 2007/0224467 A1 | 9/2007 | Nervi et al. |
| 2007/0287046 A1 | 12/2007 | Koda et al. |
| 2008/0057361 A1 | 3/2008 | Moon et al. |
| 2008/0124255 A1 | 5/2008 | Johnston |
| 2008/0160358 A1 | 7/2008 | Parodi et al. |
| 2009/0029204 A1 | 1/2009 | Venkataraman |
| 2009/0042070 A1 | 2/2009 | Brown, Jr. et al. |
| 2009/0169452 A1 | 7/2009 | Constantz et al. |
| 2009/0208784 A1 | 8/2009 | Perry et al. |
| 2009/0317667 A2 | 12/2009 | Nervi et al. |
| 2009/0317669 A1 | 12/2009 | Hildebrandt et al. |
| 2010/0015486 A1 | 1/2010 | Yoshiba |
| 2010/0148410 A1 | 6/2010 | Bleifuss et al. |
| 2010/0239924 A1 | 9/2010 | McElroy et al. |
| 2011/0033771 A1 | 2/2011 | Bednarz et al. |
| 2011/0104577 A1 | 5/2011 | Cui et al. |
| 2011/0111315 A1 | 5/2011 | Cui et al. |
| 2011/0117460 A1 | 5/2011 | Shin |
| 2011/0154951 A1 | 6/2011 | Hiraoka |
| 2011/0167821 A1 | 7/2011 | Baker et al. |
| 2011/0171544 A1 | 7/2011 | Burmeister et al. |
| 2011/0223500 A1 | 9/2011 | Uematsu et al. |
| 2011/0223501 A1 | 9/2011 | Uematsu et al. |
| 2012/0028145 A1 | 2/2012 | Boden et al. |
| 2012/0171588 A1 | 7/2012 | Fan et al. |
| 2012/0214076 A1 | 8/2012 | Hakala |
| 2012/0251898 A1 | 10/2012 | Lehar et al. |
| 2012/0325053 A1 | 12/2012 | Grossi |
| 2013/0014484 A1 | 1/2013 | Caprile et al. |
| 2013/0081516 A1 | 4/2013 | Simmons |
| 2013/0177824 A1 | 7/2013 | Cui et al. |
| 2013/0209904 A1 | 8/2013 | Liu et al. |
| 2013/0337360 A1 | 12/2013 | Mahoney et al. |
| 2014/0260310 A1 | 9/2014 | Berlowitz et al. |
| 2015/0093665 A1 | 4/2015 | Barckholtz et al. |
| 2017/0191139 A1 | 7/2017 | Berlowitz et al. |
| 2017/0271701 A1 | 9/2017 | Berlowitz et al. |

(56) References Cited

U.S. PATENT DOCUMENTS

| | | |
|---|---|---|
| 2019/0386317 A1 | 12/2019 | Poizeau et al. |
| 2020/0020965 A1 | 1/2020 | Wang et al. |

FOREIGN PATENT DOCUMENTS

| | | |
|---|---|---|
| CA | 2551219 A1 | 1/2007 |
| CA | 2694153 A1 | 9/2011 |
| CN | 101098022 A | 1/2008 |
| CN | 201902241 U | 7/2011 |
| DE | 40 05 468 A1 | 8/1991 |
| DE | 19515669 A1 | 10/1996 |
| DE | 19545186 A1 | 6/1997 |
| DE | 196 09 313 C1 | 9/1997 |
| DE | 199 41 724 A1 | 8/2000 |
| DE | 100 16 847 A1 | 10/2001 |
| DE | 10 2006 047 823 A1 | 2/2008 |
| DE | 10 2008 019 981 A1 | 10/2009 |
| EP | 0 170 277 A2 | 2/1986 |
| EP | 0 180 941 A2 | 5/1986 |
| EP | 0 473 153 A2 | 3/1992 |
| EP | 0 502 125 A1 | 9/1992 |
| EP | 0 678 926 A1 | 10/1995 |
| EP | 0 685 897 A1 | 12/1995 |
| EP | 0 691 701 A1 | 1/1996 |
| EP | 1 670 090 A1 | 6/2006 |
| EP | 1 926 171 A1 | 5/2008 |
| EP | 2 182 572 A1 | 5/2010 |
| EP | 2 991 139 A1 | 3/2016 |
| JP | S56-69775 A | 6/1981 |
| JP | H05-163180 A | 6/1993 |
| JP | H08-96824 A | 4/1996 |
| JP | H10-172595 A | 6/1998 |
| JP | H11-91427 A | 4/1999 |
| JP | H11-312527 A | 11/1999 |
| JP | 2002-151111 A | 5/2002 |
| JP | 2002-319428 A | 10/2002 |
| JP | 2004-014124 A | 1/2004 |
| JP | 2004-079495 A | 3/2004 |
| JP | 2004-186074 A | 7/2004 |
| JP | 2005-190981 A | 7/2005 |
| JP | 2006-073316 A | 3/2006 |
| JP | 2007-287580 A | 11/2007 |
| JP | 2008-192425 A | 8/2008 |
| JP | 2008-287940 A | 11/2008 |
| JP | 2009-043487 A | 2/2009 |
| JP | 2013-045535 A1 | 3/2013 |
| KR | 10-0651270 B1 | 11/2006 |
| KR | 10-0827954 B1 | 5/2008 |
| KR | 2009-0067426 A | 6/2009 |
| KR | 2009-0124824 A | 12/2009 |
| KR | 2010-0032974 A | 3/2010 |
| KR | 2011-0029963 A | 3/2011 |
| KR | 2011-0032443 A | 3/2011 |
| KR | 2011-0077775 A | 7/2011 |
| KR | 2012-0050319 A | 5/2012 |
| KR | 2014-0085839 A | 7/2014 |
| KR | 2015-0066314 A | 6/2015 |
| KR | 2016-0041309 A | 4/2016 |
| NL | 1008883 C2 | 10/1999 |
| WO | 91/08595 A1 | 6/1991 |
| WO | 97/21257 A2 | 6/1997 |
| WO | 97/33828 A1 | 9/1997 |
| WO | 00/31815 A1 | 6/2000 |
| WO | 02/069430 A2 | 9/2002 |
| WO | 02/070402 A2 | 9/2002 |
| WO | 2002/103833 A1 | 12/2002 |
| WO | 2003/063276 A2 | 7/2003 |
| WO | 2004/013924 A2 | 2/2004 |
| WO | 2005/001977 A1 | 1/2005 |
| WO | 2008/036169 A2 | 3/2008 |
| WO | 2010/044113 A1 | 4/2010 |
| WO | 2010/067223 A1 | 6/2010 |
| WO | 2010/125443 A1 | 11/2010 |
| WO | 2010/147885 A1 | 12/2010 |
| WO | 2010/147886 A1 | 12/2010 |
| WO | 2011/077224 A1 | 6/2011 |
| WO | 2012/091096 A1 | 7/2012 |
| WO | 2012/128928 A1 | 9/2012 |
| WO | 2012/176176 A1 | 12/2012 |
| WO | 2012/176177 A1 | 12/2012 |
| WO | 2017/223218 A1 | 12/2017 |

OTHER PUBLICATIONS

"Heat of Combustion", Wikipedia, Retrieved from Internet URL : http://en.wikipediaorg/wiki/Lower_heating_value, accessed on Jun. 24, 2014, p. 8.

"Lower and Higher Heating Values of Fuels", Hydrogen Data Resource Center: Hydrogen Calculator, p. 1 (2012).

"Molten Carbonate Fuel Cell Technology", Fossil Energy—U.S. Department of Energy, pp. 2 (Jan. 31, 2011).

"Test and Quality Assurance Plan : FuelCell Energy, Inc.—DFC 300A Molten Carbonate Fuel Cell Combined Heat and Power System", Greenhouse Gas Technology Center, pp. 1-42 (Mar. 2007).

Avidan, A. A., "Gasoline and Distillate Fuels from Methanol", Elsevier Science Publishers B.V, pp. 307-323 (1988).

Appleby A. J., and Selman, J. R., "Current Technology of PAFC, MCFC and SOFC Systems: Status of Present Fuel Cell Power Plants", Electrochemical Hydrogen Technologies, pp. 425-495 (Jan. 1, 1990).

Appleby, A. J., "Fuel Cells and Hydrogen Fuel", International Journal of Hydrogen Energy, vol. 19, No. 2, pp. 175-180 (1994).

Amorelli, A., et al., "An experimental investigation into the use of molten carbonate fuel cells to capture CO2 from gas turbine exhaust gases", Second annual conference on Carbon Sequestration, pp. 1-9 (May 5-8, 2003).

Amorelli, A., et al., "An experimental investigation into the use of molten carbonate fuel cells to capture CO2 from gas turbine exhaust gases", Energy, vol. 29, pp. 1279-1284 (2004).

Abu-Zahra, M. R.M, et al.,"CO2 capture from power plants: Part I. A parametric study of the technical performance based on monoethanolamine", International Journal of Greenhouse Gas Control, vol. 1, pp. 37-46 (2007).

Appl, M., "Ammonia, 3. Production Plants", Ullmann's Encyclopedia of Industrial Chemistry, vol. 3, pp. 1-35 (2012).

Bianchi A., et al., "Bimodal Pore Size Distribution in MCFC Cathode Structure", Extended Abstracts, Electrochemical Society, vol. 95/01, pp. 858-859 (May 1995).

Cavallaro, S., et al., "Syngas and electricity production by an integrated autothermal reforming/molten carbonate fuel cell system", Journal of Power Sources, vol. 76, pp. 190-196 (1998).

Chiesa, P., et al., "A Comparative Analysis of IGCCs with CO2 Sequestration", Greenhouse Gas Control Technologies, pp. 107-112 (1999).

Campanari, S., "Carbon Dioxide separation from high temperature fuel cell power plants", Journal of Power Sources, vol. 112, pp. 273-289 (2002).

Campanari, S., et al., "CO2 capture from combined cycles integrated with Molten Carbonate Fuel Cells", International Journal of Greenhouse Gas Control, vol. 4, pp. 441-451 (2010).

Campanari, S., et al., "Application of MCFCs for active CO2 capture within natural gas combined cycles", Energy Procedia, vol. 4, pp. 1235-1242 (2011).

Caprile, L., et al., "Carbon capture: Energy wasting technologies or the MCFCs challenge?", International Journal of Hydrogen Energy, vol. 36, p. 10269-10277 (2011).

Chiesa, P., et al., "CO2 cryogenic separation from combined cycles integrated with molten carbonate fuel cells", International Journal of Hydrogen Energy, vol. 36, p. 10355-10365 (2011).

Desideri, U., et al., "MCFC-based CO2 capture system for small scale CHP plants", International Journal of Hydrogen Energy, vol. 37, p. 19295-19303 (2012).

Ghezel-Ayagh, H., "High Efficiency Direct FuelCell/Turbine® Power Plant", Project Fact Sheet, Fuel Cell Energy, pp. 3 (2011).

Ghezel-Ayagh, H., "Electrochemical Membrane for CO2 Capture and Power Generation", Presentation at the 2012 NETL CO2 Capture Technology Meeting, Fuel Cell Energy, p. 12 (Jul. 9, 2012).

(56) References Cited

OTHER PUBLICATIONS

Giddey, S., et al., "A comprehensive review of direct carbon fuel cell technology", Progress in Energy Combustion Science, vol. 38, pp. 360-399 (2012).
Keil, F. J., "Methanol-to-hydrocarbons: process technology", Microporous and Mesoporous Materials, vol. 29, pp. 49-66 (1999).
Kim, D. H., et al., "Numerical studies of a separator for stack temperature control in a molten carbonate fuel cell", International Journal of Hydrogen Energy, vol. 36, pp. 8499-8507 (2011).
Lowe, C., et al., "Technology Assessment of Hydrogen Firing of Process Heaters", Energy Procedia, ScienceDirect, vol. 4, pp. 1058-1065 (2011).
Morita, H., et al., "Degradation Mechanism of Molten Carbonate Fuel Cell Based on Long-Term Performance: Long-Term Operation by Using Bench-Scale Cell and Post-Test Analysis of the Cell", Journal of Power Sources, vol. 195, pp. 6988-6996 (2010).
Manzolini, G., et al., "CO2 Separation from Combined Cycles Using Molten Carbonate Fuel Cells", Journal of Fuel Gell Science and Technology, vol. 9, pp. 011018-1 to 011018-8 (2012).
Naqvi, S. N., "Dimethyl Ether As Fuel", SRI Consulting Report, Report No. 245A, pp. 188 (Sep. 2005).
Pilatowsky, I., et al., "Thermodynamics Of Fuel Cells", Cogeneration Fuel Cell-Sorption Air Conditioning Systems, pp. 25-36 (2011).
Sugiura, K., et al., "The carbon dioxide concentrator by using MCFC", Journal of Power Sources, vol. 118, pp. 218-227 (2003).
Steynberg, A., "Gas loop for POX reformers : Figure 8", Studies in Surface Science and Catalysis: Fischer Tropsch Technology, vol. 152, p. 8 (2004).
Verda, V., and Nicolin, F., "Thermodynamic and economic optimization of a MCFC-based hybrid system for the combined production of electricity and hydrogen", International Journal of Hydrogen Energy, vol. 35, pp. 794-806 (2010).
Wesoff, E., "Will FuelCell Energy Be The First Profitable Company In The Industry?", Greentech Media, p. 3 (Dec. 15, 2011).
Zhou, W., et al., "Decrease of energy demand for bioethanol-based polygeneration system through case study", Applied Energy, vol. 95, pp. 305-311 (2012).
International Search Report and Written Opinion received for PCT Patent Application No. PCT/US2019/063296, dated Feb. 18, 2020, 11 pages.
International Search Report and Written Opinion received for PCT Patent Application No. PCT/US2019/063255, dated Mar. 4, 2020, 11 pages.
International Search Report and Written opinion received for PCT Patent Application No. PCT/US2019/063293, dated Mar. 13, 2020, 10 pages.
International Search Report and Written Opinion received for PCT Patent Application No. PCT/US2019/063301, dated Mar. 13, 2020, 9 pages.
International Search Report and Written Opinion received for PCT Patent Application No. PCT/US2019/063248, dated Mar. 13, 2020, 10 pages.
International Search Report and Written Opinion received for PCT Patent Application No. PCT/US2019/063434, dated Mar. 24, 2020, 11 pages.
International Search Report and Written Opinion received for PCT Patent Application No. PCT/US2019/063337, dated Mar. 31, 2020, 9 pages.
International Search Report and Written Opinion received for PCT Patent Application No. PCT/US2019/063304, dated Apr. 1, 2020, 11 pages.
International Search Report and Written Opinion received for PCT Patent Application No. PCT/US2019/063291, dated Aug. 18, 2020, 13 pages.
International Search Report and Written Opinion received for PCT Patent Application No. PCT/US2019/063345, dated Aug. 20, 2020, 13 pages.
International Search Report and Written Opinion received for PCT Patent Application No. PCT/US2019/063333, dated Nov. 25, 2020, 20 pages.
Non-Final Office Action dated Jun. 16, 2021, in U.S. Appl. No. 16/695,356, 5 pages.
Non-Final Office Action dated Jul. 22, 2021, in U.S. Appl. No. 16/695,368, 8 pages.
Non-Final Office Action dated Aug. 3, 2021, in U.S. Appl. No. 16/695,276, 17 pages.
Non-Final Office Action dated Aug. 10, 2021, in U.S Appl. No. 16/695,281, 15 pages.
Final Office Action dated Nov. 15, 2021 in U.S. Appl. No. 16/695,368, 14 pages.

\* cited by examiner

REGENERATION OF MOLTEN CARBONATE FUEL CELLS FOR DEEP CO$_2$ CAPTURE

CROSS-REFERENCE TO RELATED APPLICATIONS

This application claims priority to U.S. Patent Application No. 62/773,408, filed Nov. 30, 2018 and entitled "Regeneration of Molten Carbonate Fuel Cells for Deep CO$_2$ Capture." The entirety of the aforementioned application is incorporated by reference herein.

FIELD

Systems and methods are provided for regeneration of molten carbonate fuel cells during operation under enhanced CO$_2$ utilization conditions with low CO$_2$ content cathode input streams.

BACKGROUND

This application discloses and claims subject matter made as a result of activities within the scope of a joint research agreement between ExxonMobil Research and Engineering Company and FuelCell Energy, Inc. that was in effect on or before the effective filing date of the present application.

Molten carbonate fuel cells utilize hydrogen and/or other fuels to generate electricity. The hydrogen may be provided by reforming methane or other reformable fuels in a steam reformer, such as a steam reformer located upstream of the fuel cell and/or a reforming stage integrated within the fuel cell. Fuel can also be reformed in the anode cell in a molten carbonate fuel cell, which can be operated to create conditions that are suitable for reforming fuels in the anode. Still another option can be to perform some reforming both externally and internally to the fuel cell. Reformable fuels can encompass hydrocarbonaceous materials that can be reacted with steam and/or oxygen at elevated temperature and/or pressure to produce a gaseous product that comprises hydrogen.

One of the attractive features of molten carbonate fuel cells is the ability to transport CO$_2$ from a low concentration stream (such as a cathode input stream) to a higher concentration stream (such as an anode output flow). During operation, CO$_2$ and O$_2$ in an MCFC cathode are converted to a carbonate ion (CO$_3^{2-}$), which is then transported across the molten carbonate electrolyte as a charge carrier. The carbonate ion reacts with H$_2$ in the fuel cell anode to form H$_2$O and CO$_2$. Thus, one of the net outcomes of operating the MCFC is transport of CO$_2$ across the electrolyte. This transport of CO$_2$ across the electrolyte can allow an MCFC to generate electrical power while reducing or minimizing the cost and/or challenge of sequestering carbon oxides from various CO$_N$-containing streams. When an MCFC is paired with a combustion source, such as a natural gas fired power plant, this can allow for additional power generation while reducing or minimizing the overall CO$_2$ emissions that result from power generation.

U.S. Patent Application Publication 2015/0093665 describes methods for operating a molten carbonate fuel cell with some combustion in the cathode to provide supplemental heat for performing additional reforming (and/or other endothermic reactions) within the fuel cell anode. The publication notes that the voltage and/or power generated by a carbonate fuel cell can start to drop rapidly as the CO$_2$ concentration falls below about 1.0 mole %. The publication further states that as the CO$_2$ concentration drops further, e.g., to below about 0.3 vol %, at some point the voltage across the fuel cell can become low enough that little or no further transport of carbonate may occur and the fuel cell ceases to function.

An article by Manzolini et al. (*Journal of Fuel Cell Science and Technology*, Vol. 9, 2012) describes a method for modeling the performance of a power generation system using a fuel cell for CO$_2$ separation. Various fuel cell configurations are modeled for processing a CO$_2$-containing exhaust from a natural gas combined cycle turbine. The fuel cells are used to generate additional power while also concentrating CO$_2$ in the anode exhaust of the fuel cells. The lowest CO$_2$ concentration modeled for the cathode outlet of the fuel cells was roughly 1.4 vol %.

SUMMARY

In various aspects, a method for producing electricity is provided. The method can allow a molten carbonate fuel cell to operate with substantial alternative ion transport during at least a first time period of an operating cycle while also allowing the fuel cell to regenerate during a second time period of the operating cycle.

In some aspects, the method can include operating a molten carbonate fuel cell comprising an anode and a cathode, for a first time period, at a first operating condition comprising a first transference of 0.95 or less and a first average current density of 60 mA/cm$^2$ or more, to generate an anode exhaust comprising H$_2$, CO, and CO$_2$, and a cathode exhaust comprising 2.0 vol % or less CO$_2$, 1.0 vol % or more O$_2$, and 1.0 vol % or more H$_2$O. The method can further include operating the molten carbonate fuel cell, for a second time period, at a second operating condition comprising a second transference of greater than 0.95 to generate an anode exhaust and a cathode exhaust.

Additionally or alternately, in some aspects the method can include introducing an anode input stream into an anode of a molten carbonate fuel cell along a first anode axis. The method can further include introducing a cathode input stream comprising O$_2$, CO$_2$, and H$_2$O into a cathode of the molten carbonate fuel cell along a first cathode axis. The method can further include operating the molten carbonate fuel cell, for a first time period, at a first operating condition comprising a first transference of 0.95 or less and a first average current density of 60 mA/cm$^2$ or more, to generate an anode exhaust comprising H$_2$, CO, and CO$_2$, and a cathode exhaust comprising 2.0 vol % or less CO$_2$, 1.0 vol % or more O$_2$, and 1.0 vol % or more H$_2$O. The method can further include changing the flow direction of a) the anode input stream to correspond to a second anode axis, b) the cathode input stream to correspond to a second cathode axis, or c) a combination of a) and b). The method can further include operating the molten carbonate fuel cell, for a second time period, at a second operating condition comprising a second transference of 0.95 or less and a second average current density of 60 mA/cm$^2$ or more, to generate an anode exhaust comprising H$_2$, CO, and CO$_2$, and a cathode exhaust comprising 2.0 vol % or less CO$_2$, 1.0 vol % or more O$_2$, and 1.0 vol % or more H$_2$O, the second operating condition further comprising the changed flow direction.

DETAILED DESCRIPTION OF THE EMBODIMENTS

Overview

Figure 1:
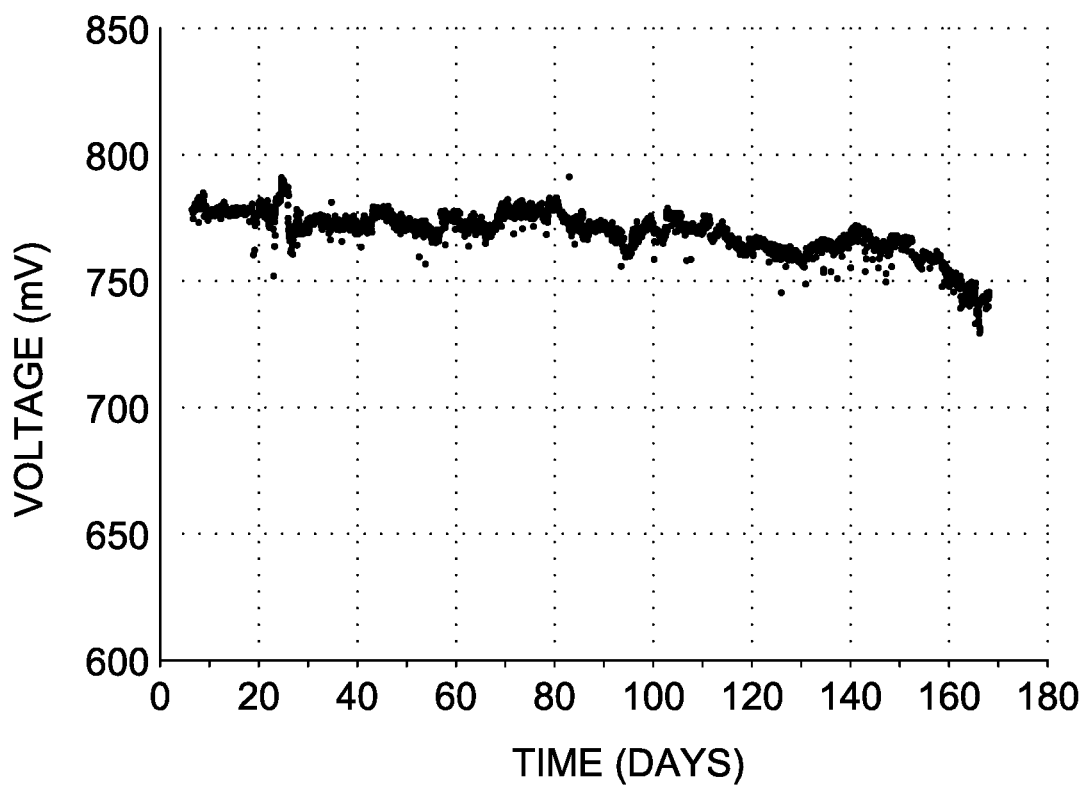
FIG. 1 shows an example of average current density over time for a fuel cell operated under conventional conditions.

In various aspects, systems and methods are provided for operating molten carbonate fuel cells to allow for periodic regeneration of the fuel cells while performing elevated $CO_2$ capture on cathode input streams. Due to high amounts of alternative ion transport during elevated $CO_2$ utilization conditions, regions of the molten carbonate fuel cells can become degraded and/or deactivated, and eventually can become unsuitable for any type of ion transport. It has been discovered that this difficulty can be overcome by periodically regenerating the molten carbonate fuel cells. In some aspects, periodic regeneration can be achieved by shifting the location within the fuel cells where the highest density of alternative ion transport is occurring. Such a shift can result in a new location having a highest density of alternative ion transport, while the previous location can primarily transport carbonate ions. Without being bound by any particular theory, it is believed that allowing primarily carbonate ion transport to occur at a location can contribute to the regeneration/recovery of locations in a fuel cell where substantial alternative ion transport has occurred. Additionally or alternately, periodic regeneration can be performed by modifying the input flows to the fuel cell and/or relaxing the operating conditions of the fuel cell to reduce or minimize the amount of alternative ion transport. Without being bound by any particular theory, such reduction or minimization of alternative ion transport can also allow for primarily carbonate ion transport at locations where regeneration is desired.

Conventional operating conditions for molten carbonate fuel cells typically correspond to conditions where the amount of alternative ion transport is reduced, minimized, or non-existent. The amount of alternative ion transport can be quantified based on the transference for a fuel cell. The transference is defined as the fraction of ions transported across the molten carbonate electrolyte that corresponds to carbonate ions, as opposed to hydroxide ions and/or other ions. A convenient way to determine the transference can be based on comparing a) the measured change in $CO_2$ concentration at the cathode inlet versus the cathode outlet with b) the amount of carbonate ion transport required to achieve the current density being produced by the fuel cell. It is noted that this definition for the transference assumes that back-transport of $CO_2$ from the anode to the cathode is minimal. It is believed that such back-transport is minimal for the operating conditions described herein. For the $CO_2$ concentrations, the cathode input stream and/or cathode output stream can be sampled, with the sample diverted to a gas chromatograph for determination of the $CO_2$ content. The average current density for the fuel cell can be measured in any convenient manner.

Under conventional operating conditions, the transference can be relatively close to 1.0, such as 0.98 or more and/or such as having substantially no alternative ion transport. A transference of 0.98 or more means that 98% or more of the ionic charge transported across the electrolyte corresponds to carbonate ions. It is noted that hydroxide ions have a charge of $-1$ while carbonate ions have a charge of $-2$, so two hydroxide ions need to be transported across the electrolyte to result in the same charge transfer as transport of one carbonate ion.

In contrast to conventional operating conditions, operating a molten carbonate fuel cell with transference of 0.95 or less can increase the effective amount of carbonate ion transport that is achieved, even though a portion of the current density generated by the fuel cell is due to transport of ions other than carbonate ions. In order to operate a fuel cell with a transference of 0.95 or less, depletion of $CO_2$ has to occur within the fuel cell cathode. It has been discovered that such depletion of $CO_2$ within the cathode tends to be localized. As a result, many regions within a fuel cell cathode can still have sufficient $CO_2$ for normal operation. These regions contain additional $CO_2$ that would be desirable to transport across an electrolyte, such as for carbon capture. However, the $CO_2$ in such regions is typically not transported across the electrolyte when operating under conventional conditions. By selecting operating conditions with a transference of 0.95 or less, the regions with sufficient $CO_2$ can be used to transport additional $CO_2$ while the depleted regions can operate based on alternative ion transport. This can increase the practical limit for the amount of $CO_2$ captured from a cathode input stream.

Conventionally, it would be expected that depletion of $CO_2$ within the cathode would lead to reduced voltage and reduced current density. However, it has been discovered that current density can be maintained as $CO_2$ is depleted due to ions other than $CO_3^{2-}$ being transported across the electrolyte, such as hydroxide ions. The transport of alternative ions across the electrolyte can allow a fuel cell to maintain a target current density even though the amount of $CO_2$ transported across the electrolyte is insufficient.

One of the advantages of transport of alternative ions across the electrolyte is that the fuel cell can continue to operate, even though a sufficient number of $CO_2$ molecules are not kinetically available. This can allow additional $CO_2$ to be transferred from cathode to anode even though the amount of $CO_2$ present in the cathode would conventionally be considered insufficient for normal fuel cell operation. This can allow the fuel cell to operate with a measured $CO_2$ utilization closer to 100%, while the calculated $CO_2$ utilization (based on current density) can be at least 5% greater than the measured $CO_2$ utilization, or at least 10% greater or at least 20% greater. It is noted that alternative ion transport can allow a fuel cell to operate with a current density that would correspond to more than 100% calculated $CO_2$ utilization.

Although transport of alternative ions can allow a fuel cell to maintain a target current density, it has further been discovered that transport of alternative ions across the electrolyte can also reduce or minimize the lifetime of a molten carbonate fuel cell. Thus, mitigation of this loss in fuel cell lifetime is desirable. It has been unexpectedly discovered that the reduction in fuel cell lifetime can be minimized or avoided by performing periodic regeneration of the fuel cell.

In some aspects, elevated $CO_2$ utilization can be defined based on the amount of transference, such as a transference of 0.95 or less, or 0.93 or less, or 0.91 or less. Maintaining an operating condition with transference of 0.95 or less can typically also result in a $CO_2$ concentration in the cathode output stream of 2.0 vol % or less, or 1.5 vol % or less, or 1.0 vol % or less. At higher $CO_2$ concentrations in the cathode output stream, there is typically not sufficient local depletion of $CO_2$ to result in lower transference values.

The presence of elevated $CO_2$ capture can also be indicated by other factors, although such other factors are by themselves typically not a sufficient condition to indicate elevated $CO_2$ capture. For example, when using a lower $CO_2$ concentration cathode input stream, elevated $CO_2$ capture can in some aspects correspond to a $CO_2$ utilization of 70% or more, or 75% or more, or 80% or more, such as up to 95% or possibly still higher. Examples of lower concentration sources of $CO_2$ can correspond to $CO_2$ sources that result in cathode input streams containing 5.0 vol % or less of $CO_2$, or 4.0 vol % or less, such as down to 1.5 vol % or possibly lower. The exhaust from a natural gas turbine is an example of a $CO_2$-containing stream that often has a $CO_2$ content of 5.0 vol % or less of $CO_2$, or 4.0 vol % or less. Additionally or alternately, elevated $CO_2$ capture can correspond to operating conditions where the molten carbonate fuel cell is used to generate a substantial amount of current density, such as 60 mA/cm² or more, or 80 mA/cm² or more, or 100 mA/cm² or more, or 120 mA/cm² or more, or 150 mA/cm² or more, or 200 mA/cm² or more, such as up to 300 mA/cm² or possibly still higher. It is noted that alternative ion transport can also be indicated by a reduced operating voltage for a fuel cell, as the reaction pathway for alternative ion transport has a lower theoretical voltage than the reaction pathway that uses carbonate ions.

The conventional or expected reaction within the cathode of a molten carbonate fuel cell is a reaction between $CO_2$, $O_2$, and electrons to form a carbonate ion.

$$CO_2 + \tfrac{1}{2}O_2 + 2e^- => CO_3^{2-} \qquad (1)$$

The resulting carbonate ion can then be transported across the molten carbonate electrolyte to the anode, where the carbonate ion reacts with $H_2$ to release the electrons.

$$CO_3^{2-} + H_2 => H_2O + CO_2 + 2e^- \qquad (2)$$

An alternative set of reactions is available that could result in transport of charge across the electrolyte, but these alternative reactions are substantially less favorable under conventional fuel cell operating conditions. This alternative set of reactions involves transport of a hydroxide ion across the electrolyte. The hydroxide ion can be formed when the $CO_2$ concentration is sufficiently low, but both oxygen and water are present.

$$H_2O + \tfrac{1}{2}O_2 + 2e^- => 2OH^- \qquad (3)$$

The hydroxide ion can then be transported across the electrolyte for reaction with $H_2$ to release the electrons.

$$2OH^- + H_2 => 2H_2O + 2e^- \qquad (4)$$

Although the net reaction in equations (3) and (4) contributes to the total current of the fuel cell, no carbon dioxide is transported across the electrolyte by this alternative mechanism.

Conventionally, the $CO_2$ concentration in the cathode exhaust of a molten carbonate fuel cell is maintained at a relatively high value, such as 5 vol % $CO_2$ or more, or 10 vol % $CO_2$ or more, or possibly still higher. Additionally, molten carbonate fuel cells are typically operated at $CO_2$ utilization values of 70% or less. When either of these conditions are present, the dominant mechanism for transport of charge across the molten carbonate electrolyte is transport of carbonate ions. While it is possible that transport of alternative ions (such as hydroxide ions) across the electrolyte occurs under such conventional conditions, the amount of alternative ion transport is de minimis, corresponding to 2% or less of the current density (or equivalently, a transference of 0.98 or more).

As an alternative to describing operating conditions in terms of transference, the operating conditions can be described based on measured $CO_2$ utilization and "calculated" $CO_2$ utilization based on average current density. In this discussion, the measured $CO_2$ utilization corresponds to the amount of $CO_2$ that is removed from the cathode input stream. This can be determined, for example, by using gas chromatography to determine the $CO_2$ concentration in the cathode input stream and the cathode output stream. This can also be referred to as the actual $CO_2$ utilization, or simply as the $CO_2$ utilization. In this discussion, the calculated $CO_2$ utilization is defined as the $CO_2$ utilization that would occur if all of the current density generated by the fuel cell was generated based on transport of $CO_3^{2-}$ ions across the electrolyte (i.e., transport of ions based on $CO_2$). The difference in measured $CO_2$ utilization and the calculated $CO_2$ utilization can be used individually to characterize the amount of alternative ion transport, and/or these values can be used to calculate the transference, as described above.

In some aspects, any convenient type of electrolyte suitable for operation of a molten carbonate fuel cell can be used. Many conventional MCFCs use a eutectic carbonate mixture as the carbonate electrolyte, such as a eutectic mixture of 62 mol % lithium carbonate and 38 mol % potassium carbonate (62% $Li_2CO_3$/38% $K_2CO_3$) or a eutectic mixture of 52 mol % lithium carbonate and 48 mol % sodium carbonate (52% $Li_2CO_3$/48% $Na_2CO_3$). Other eutectic mixtures are also available, such as a eutectic mixture of 40 mol % lithium carbonate and 60 mol % potassium carbonate (40% $Li_2CO_3$/60% $K_2CO_3$). While eutectic mixtures of carbonate can be convenient as an electrolyte for various reasons, non-eutectic mixtures of carbonates can also be suitable. Generally, such non-eutectic mixtures can include various combinations of lithium carbonate, sodium carbonate, and/or potassium carbonate. Optionally, lesser amounts of other metal carbonates can be included in the electrolyte as additives, such as other alkali carbonates (rubidium carbonate, cesium carbonate), or other types of metal carbonates such as barium carbonate, bismuth carbonate, lanthanum carbonate, or tantalum carbonate. Without being bound by any particular theory, it is believed that the alternative ion transport mechanism can occur with any conventional electrolyte for a molten carbonate fuel cell.

It is noted that the structure of a molten carbonate fuel cell can also have an impact on how quickly degradation occurs, and therefore how often regeneration can be performed to regenerate portions of the fuel cell. For example, the open area of the cathode surface that is available for receiving cathode gas can impact how rapidly degradation occurs. In order to make electrical contact, at least a portion of the cathode collector is typically in contact with the cathode surface in a molten carbonate fuel cell. The open area of a cathode surface (adjacent to the cathode current collector) is defined as the percentage of the cathode surface that is not in contact with the cathode current collector. For conventional molten carbonate fuel cell designs, a typical value for the open area is roughly 33%. This is due to the nature of conventional cathode collector configurations, which correspond to a plate-like structure that rests on the cathode surface, with a portion of the plate-like structure having openings that allow for diffusion of cathode gas into the cathode. In various aspects, additional benefit can be achieved by using a cathode current collector that provides a larger open area at the cathode surface, such as an open area of 45% or more, or 50% or more, or 60% or more, such as up to 90% or possibly still higher.

Conditions for Molten Carbonate Fuel Cell Operation with Alternative Ion Transport In various aspects, the operating conditions for a molten carbonate fuel cell (such as a cell as part of a fuel cell stack) can be selected to correspond to a transference of 0.95 or less, thereby causing the cell to transport both carbonate ion and at least one type of alternative ion across the electrolyte. In addition to transference, operating conditions that can indicate that a molten carbonate fuel cell is operating with transport of alternative ions include, but are not limited to, $CO_2$ concentration for the cathode input stream, the $CO_2$ utilization in the cathode, the current density for the fuel cell, the voltage drop across the cathode, the voltage drop across the anode, and the $O_2$ concentration in the cathode input stream. Additionally, the anode input stream and fuel utilization in the anode can be generally selected to provide the desired current density.

Generally, to cause alternative ion transport, the $CO_2$ concentration in at least a portion of the cathode needs to be sufficiently low while operating the fuel cell to provide a sufficiently high current density. Having a sufficiently low $CO_2$ concentration in the cathode typically corresponds to some combination of a low $CO_2$ concentration in the cathode input flow, a high $CO_2$ utilization, and/or a high average current density. However, such conditions alone are not sufficient to indicate a transference of 0.95 or less.

For example, a molten carbonate fuel cell with a cathode open area of roughly 33% was operated with a $CO_2$ cathode inlet concentration of 19 vol %, 75% $CO_2$ utilization, and 160 mA/cm² of average current density. These conditions corresponded to a difference between calculated $CO_2$ utilization and measured $CO_2$ utilization of less than 1%. Thus, the presence of substantial alternative ion transport/a transference of 0.95 or less cannot be inferred simply from the presence of a high $CO_2$ utilization and a high average current density.

As another example, a molten carbonate fuel cell with a cathode open area of between 50% and 60% was operated with a $CO_2$ cathode inlet concentration of 4.0 vol %, 89% $CO_2$ utilization, and 100 mA/cm² of current density. These conditions corresponded to a transference of at least 0.97. Thus, the presence of a transference of 0.95 or less/substantial alternative ion transport cannot be inferred simply from the presence of high $CO_2$ utilization in combination with low $CO_2$ concentration in the cathode input stream.

As still another example, a molten carbonate fuel cell with a cathode open area of between 50% and 60% was operated with a $CO_2$ cathode inlet concentration of 13 vol %, 68% $CO_2$ utilization, and 100 mA/cm² of current density. These conditions corresponded to a transference of at least 0.98.

In this discussion, operating an MCFC to transport alternative ions across the electrolyte is defined as operating the MCFC so that more than a de minimis amount of alternative ions are transported. It is possible that minor amounts of alternative ions are transported across an MCFC electrolyte under a variety of conventional conditions. Such alternative ion transport under conventional conditions can correspond to a transference of 0.98 or more, which corresponds to transport of alternative ions corresponding to less than 2.0% of the current density for the fuel cell. By contrast, in this discussion, operating an MCFC to cause alternative ion transport is defined as operating an MCFC with a transference of 0.95 or less, so that 5.0% or more of the current density (or, 5.0% or more of the calculated $CO_2$ utilization) corresponds to current density based on transport of alternative ions, or 10% or more, or 20% or more, such as up to 35% or possibly still higher.

In this discussion, operating an MCFC to cause substantial alternative ion transport (i.e., to operate with a transference of 0.95 or less) is further defined to correspond to operating an MCFC with voltage drops across the anode and cathode that are suitable for power generation. The total electrochemical potential difference for the reactions in a molten carbonate fuel cell is −1.04 V. Due to practical considerations, an MCFC is typically operated to generate current at a voltage near 0.7 V or about 0.8 V. This corresponds to a combined voltage drop across the cathode, electrolyte, and anode of roughly 0.34 V. In order to maintain stable operation, the combined voltage drop across the cathode, electrolyte, and anode can be less than ~0.5 V, so that the resulting current generated by the fuel cell is at a voltage of 0.55 V or more, or 0.6 V or more.

In addition to the above, the conditions for causing alternative ion transport can generally include having sufficient $O_2$ concentration in the cathode for typical conventional operation as well as operating the anode in a manner consistent with conventional operation. With regard to $O_2$ in the cathode input stream, in some aspects this can correspond to an oxygen content of 4.0 vol % to 15 vol %, or 6.0 vol % to 10 vol %. Also, for alternative ion transport based on hydroxide ions, sufficient water should be present in the cathode input stream to allow for the alternative ion transport. The amount of $H_2O$ in the cathode input stream can be sufficient so that the $H_2O$ content in the cathode exhaust is 1.0 vol % or more. In some aspects, this can correspond to having 3.0 vol % or more of $H_2O$ in the cathode input stream, although any convenient amount can be present so long as sufficient $CO_2$ and $O_2$ are also present.

Suitable conditions for the anode can also include providing the anode with $H_2$, a reformable fuel, or a combination thereof; and operating with any convenient fuel utilization that generates a desired current density, including fuel utilizations ranging from 20% to 80%. In some aspects this can correspond to a traditional fuel utilization amount, such as a fuel utilization of 60% or more, or 70% or more, such as up to 80% or 85% or possibly still higher. In other aspects, this can correspond to a fuel utilization selected to provide an anode output stream with an elevated content of $H_2$ and/or an elevated combined content of $H_2$ and CO (i.e., syngas), such as a fuel utilization of 55% or less, or 50% or less, or 40% or less, such as down to 20% or possibly still lower. The $H_2$ content in the anode output stream and/or the combined content of $H_2$ and CO in the anode output stream can be sufficient to allow generation of a desired current density. In some aspects, the $H_2$ content in the anode output stream can be 3.0 vol % or more, or 5.0 vol % or more, or 8.0 vol % or more, such as up to 15 vol % or possibly still higher. Additionally or alternatively, the combined amount of $H_2$ and CO in the anode output stream can be 4.0 vol % or more, or 6.0 vol % or more, or 10 vol % or more, such as up to 20 vol % or possibly still higher. Optionally, when the fuel cell is operated with low fuel utilization, the $H_2$ content in the anode output stream can be in a higher range, such as an $H_2$ content of 10 vol % to 25 vol %. In such aspects, the syngas content of the anode output stream can be correspondingly higher, such as a combined $H_2$ and CO content of 15 vol % to 35 vol %. Depending on the aspect, the anode can be operated to increase the amount of electrical energy generated, to increase the amount of chemical energy generated, (i.e., $H_2$ generated by reforming that is available in the anode output stream), or operated using any other convenient strategy that is compatible with operating the fuel cell to cause alternative ion transport.

In this discussion, a fuel cell can correspond to a single cell, with an anode and a cathode separated by an electrolyte. The anode and cathode can receive input gas flows to facilitate the respective anode and cathode reactions for transporting charge across the electrolyte and generating electricity. A fuel cell stack can represent a plurality of cells in an integrated unit. Although a fuel cell stack can include multiple fuel cells, the fuel cells can typically be connected in parallel and can function (approximately) as if they collectively represented a single fuel cell of a larger size. When an input flow is delivered to the anode or cathode of a fuel cell stack, the fuel cell stack can include flow channels for dividing the input flow between each of the cells in the stack and flow channels for combining the output flows from the individual cells. In this discussion, a fuel cell array can be used to refer to a plurality of fuel cells (such as a plurality of fuel cell stacks) that are arranged in series, in parallel, or in any other convenient manner (e.g., in a combination of series and parallel). A fuel cell array can include one or more stages of fuel cells and/or fuel cell stacks, where the anode/cathode output from a first stage may serve as the anode/cathode input for a second stage. It is noted that the anodes in a fuel cell array do not have to be connected in the same way as the cathodes in the array. For convenience, the input to the first anode stage of a fuel cell array may be referred to as the anode input for the array, and the input to the first cathode stage of the fuel cell array may be referred to as the cathode input to the array. Similarly, the output from the final anode/cathode stage may be referred to as the anode/cathode output from the array.

It should be understood that reference to use of a fuel cell herein typically denotes a "fuel cell stack" composed of individual fuel cells, and more generally refers to the use of one or more fuel cell stacks in fluid communication. Individual fuel cell elements (plates) can typically be "stacked" together in a rectangular array called a "fuel cell stack." This fuel cell stack can typically take a feed stream and distribute reactants among all of the individual fuel cell elements and can then collect the products from each of these elements. When viewed as a unit, the fuel cell stack in operation can be taken as a whole even though composed of many (often tens or hundreds) of individual fuel cell elements. These individual fuel cell elements can typically have similar voltages (as the reactant and product concentrations are similar), and the total power output can result from the summation of all of the electrical currents in all of the cell elements, when the elements are electrically connected in series. Stacks can also be arranged in a series arrangement to produce high voltages. A parallel arrangement can boost the current. If a sufficiently large volume fuel cell stack is available to process a given exhaust flow, the systems and methods described herein can be used with a single molten carbonate fuel cell stack. In other aspects of the invention, a plurality of fuel cell stacks may be desirable or needed for a variety of reasons.

For the purposes of this invention, unless otherwise specified, the term "fuel cell" should be understood to also refer to and/or is defined as including a reference to a fuel cell stack composed of a set of one or more individual fuel cell elements for which there is a single input and output, as that is the manner in which fuel cells are typically employed in practice. Similarly, the term fuel cells (plural), unless otherwise specified, should be understood to also refer to and/or is defined as including a plurality of separate fuel cell stacks. In other words, all references within this document, unless specifically noted, can refer interchangeably to the operation of a fuel cell stack as a "fuel cell." For example, the volume of exhaust generated by a commercial scale combustion generator may be too large for processing by a fuel cell (i.e., a single stack) of conventional size. In order to process the full exhaust, a plurality of fuel cells (i.e., two or more separate fuel cells or fuel cell stacks) can be arranged in parallel, so that each fuel cell can process (roughly) an equal portion of the combustion exhaust. Although multiple fuel cells can be used, each fuel cell can typically be operated in a generally similar manner, given its (roughly) equal portion of the combustion exhaust.

Figure 3:
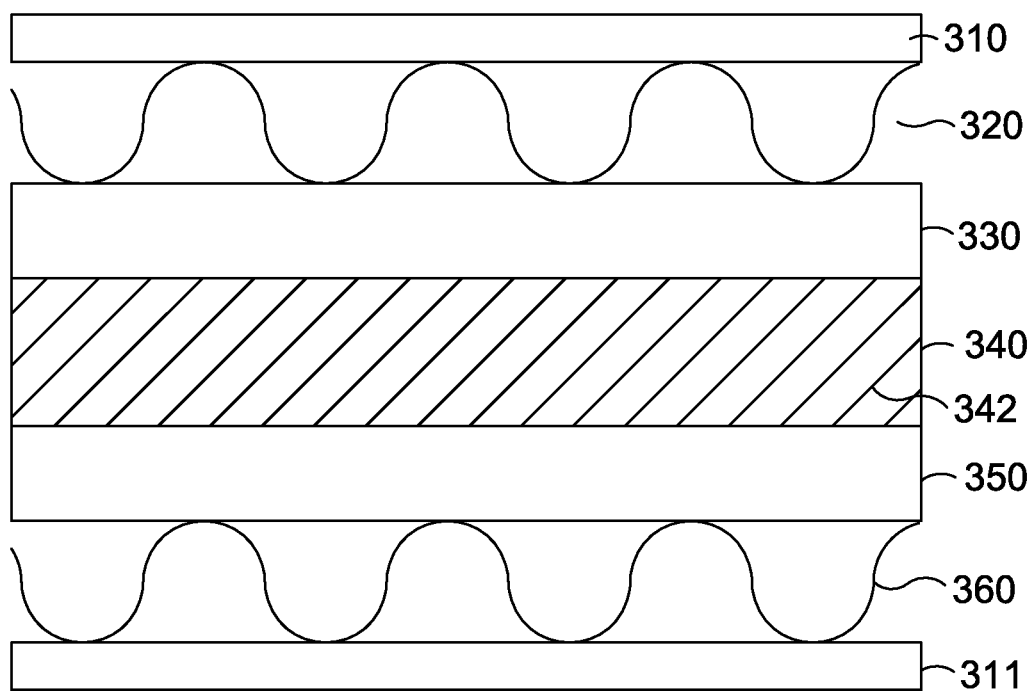
FIG. 3 shows an example of a molten carbonate fuel cell.

FIG. 3 shows a general example of a molten carbonate fuel cell. The fuel cell represented in FIG. 3 corresponds to a fuel cell that is part of a fuel cell stack. In order to isolate the fuel cell from adjacent fuel cells in the stack, the fuel cell includes separator plates 310 and 311. In FIG. 3, the fuel cell includes an anode 330 and a cathode 350 that are separated by an electrolyte matrix 340 that contains an electrolyte 342. Anode collector 320 provides electrical contact between anode 330 and the other anodes in the fuel cell stack, while cathode collector 360 provides similar electrical contact between cathode 350 and the other cathodes in the fuel cell stack. Additionally anode collector 320 allows for introduction and exhaust of gases from anode 330, while cathode collector 360 allows for introduction and exhaust of gases from cathode 350.

During operation, $CO_2$ is passed into the cathode collector 360 along with $O_2$. The $CO_2$ and $O_2$ diffuse into the porous cathode 350 and travel to a cathode interface region near the boundary of cathode 350 and electrolyte matrix 340. In the cathode interface region, a portion of electrolyte 342 can be present in the pores of cathode 350. The $CO_2$ and $O_2$ can be converted near/in the cathode interface region to a carbonate ion ($CO_3^{2-}$), which can then be transported acrosselectrolyte 342 (and therefore across electrolyte matrix 340) to facilitate generation of electrical current. In aspects where alternative ion transport is occurring, a portion of the $O_2$ can be converted to an alternative ion, such as a hydroxide ion or a peroxide ion, for transport in electrolyte 342. After transport across the electrolyte 342, the carbonate ion (or alternative ion) can reach an anode interface region near the boundary of electrolyte matrix 340 and anode 330. The carbonate ion can be converted back to $CO_2$ and $H_2O$ in the presence of $H_2$, releasing electrons that are used to form the current generated by the fuel cell. The $H_2$ and/or a hydrocarbon suitable for forming $H_2$ are introduced into anode 330 via anode collector 320.

Alternative Ion Transport and Fuel Cell Degradation

In order to operate a fuel cell to have substantial amounts of alternative ion transport, a variety of conditions are believed to be important. Some of the conditions relate to having sufficiently low concentrations of $CO_2$ in the cathode that transport of hydroxide ion becomes a thermodynamically and/or kinetically plausible pathway. Other conditions relate to having sufficiently high concentrations of other inputs to the fuel cell so that sufficiently high current densities can be achieved with the alternative ion.

With regard to the anode, one condition for operating with substantial alternative ion transport can be to have an $H_2$ concentration of 8.0 vol % or more, or 10 vol % or more in the region where the substantial alternative ion transport occurs. Depending on the aspect, this could correspond to a region near the anode inlet, a region near the cathode outlet, or a combination thereof. Generally, if the $H_2$ concentration in a region of the anode is too low, there will be insufficient driving force to generate substantial alternative ion transport.

In addition to having sufficient $H_2$ concentration in the anode, one or more locations within the cathode need to have a low enough $CO_2$ concentration so that the more favorable pathway of carbonate ion transport is not readily available. In some aspects, this can correspond to having a $CO_2$ concentration in the cathode outlet stream (i.e., cathode exhaust) of 2.0 vol % or less, or 1.0 vol % or less, or 0.8 vol % or less. It is noted that due to variations within the cathode, an average concentration of 2.0 vol % or less (or 1.0 vol % or less, or 0.8 vol % or less) in the cathode exhaust can correspond to a still lower $CO_2$ concentration in localized regions of the cathode. For example, in a cross-flow configuration, at a corner of the fuel cell that is adjacent to the anode inlet and the cathode outlet, the $CO_2$ concentration can be lower than a corner of the same fuel cell that is adjacent to the anode outlet and the cathode outlet. Similar localized variations in $CO_2$ concentration can also occur in fuel cells having a co-current or counter-current configuration.

In addition to having a low concentration of $CO_2$, the localized region of the cathode can also have 1.0 vol % or more of $O_2$, or 2.0 vol % or more. In the fuel cell, $O_2$ is used to form the hydroxide ion that allows for alternative ion transport. If sufficient $O_2$ is not present, the fuel cell will not operate as both the carbonate ion transport and alternative ion transport mechanisms are dependent on $O_2$ availability. With regard to $O_2$ in the cathode input stream, in some aspects this can correspond to an oxygen content of 4.0 vol % to 15 vol %, or 6.0 vol % to 10 vol %.

It has been observed that a sufficient amount of water should also be present for alternative ion transport to occur, such as 1.0 vol % or more, or 2.0 vol % or more. Without being bound by any particular theory, if water is not available in the cathode when attempting to operate with substantial alternative ion transport, the fuel cell appears to degrade at a much more rapid rate than the deactivation rate that is observed due to alternative ion transport with sufficient water available. It is noted that because air is commonly used as an $O_2$ source, and since $H_2O$ is one of the products generated during combustion, a sufficient amount of water is typically available within the cathode.

Due to the non-uniform distribution of cathode gas and/or anode gas during operation of a molten carbonate fuel cell for elevated $CO_2$ capture, it is believed that one or more of the corners and/or edges of the molten carbonate fuel cell will typically have a substantially higher density of alternative ion transport. The one or more corners can correspond to locations where the $CO_2$ concentration in the cathode is lower than average, or a location where the $H_2$ concentration in the anode is greater than average, or a combination thereof.

In order to illustrate the difficulty due to excessive alternative ion transport, a fuel operated in a cross-flow configuration can be considered. Generally, the flow direction within the anode of a molten carbonate fuel cell can have any convenient orientation relative to the flow direction within a cathode. One option can be to use a cross-flow configuration, so that the flow direction within the anode is roughly at a 90° angle relative to the flow direction within the cathode. This type of flow configuration can have practical benefits, as using a cross-flow configuration can allow the manifolds and/or piping for the anode inlets/outlets to be located on different sides of a fuel cell stack from the manifolds and/or piping for the cathode inlets/outlets.

Figure 4:
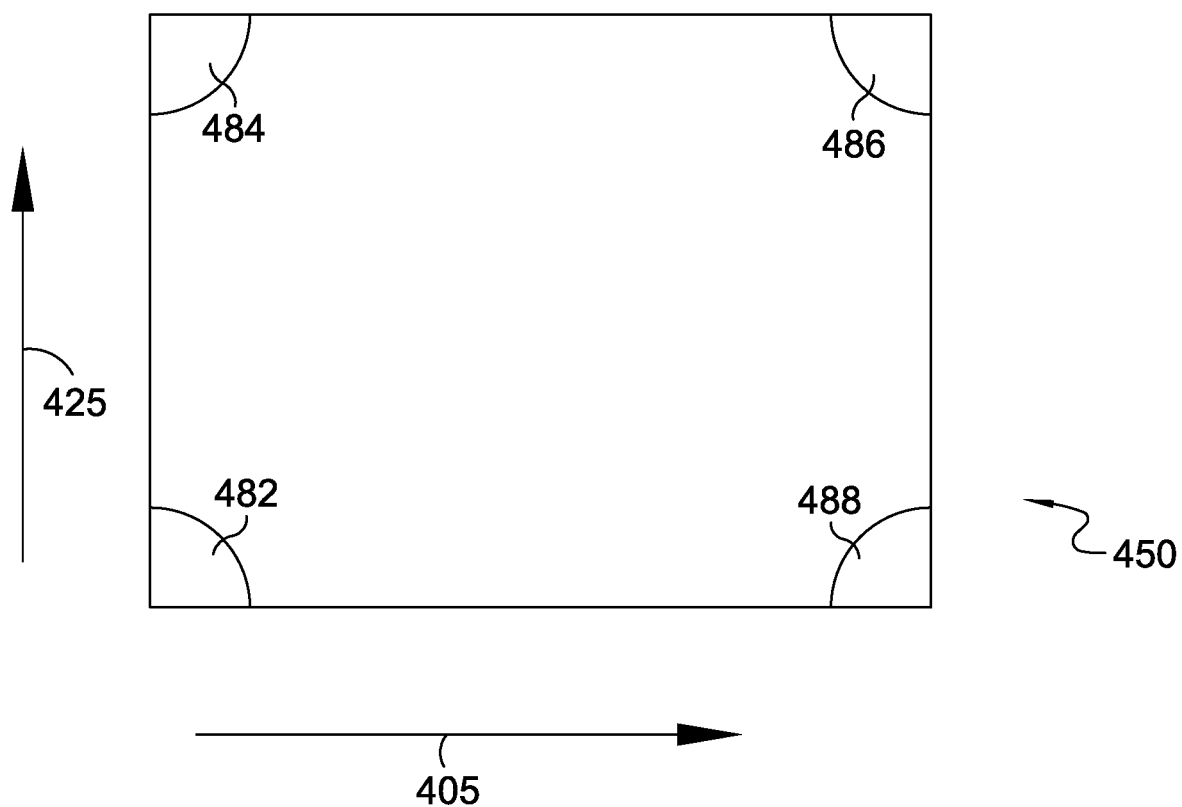
FIG. 4 shows a flow pattern example for a molten carbonate fuel cell with an anode flow direction that is aligned roughly perpendicular to a cathode flow direction.

FIG. 4 schematically shows an example of a top view for a fuel cell cathode operating in a cross-flow configuration, along with arrows indicating the direction of flow within the fuel cell cathode and the corresponding fuel cell anode. In FIG. 4, arrow 405 indicates the direction of flow within cathode 450, while arrow 425 indicates the direction of flow within the anode (not shown).

Because the anode and cathode flows are oriented at roughly 90° relative to each other, the anode and cathode flow patterns can contribute to having different reaction conditions in various parts of the cathode. The different conditions can be illustrated by considering the reaction conditions in the four corners of the cathode. In the illustration in FIG. 4, the reaction conditions described herein are qualitatively similar to the reaction conditions for a fuel cell operating with a transference of 0.95 or less.

Corner 482 corresponds to a portion of the fuel cell that is close to the entry point for both the cathode input flow and the anode input flow. As a result, the concentration of both $CO_2$ (in the cathode) and $H_2$ (in the anode) is relatively high in corner 482. Based on the high concentrations, it is expected that portions of the fuel cell near corner 482 can operate under expected conditions, with substantially no transport of ions other than carbonate ions across the electrolyte.

Corner 484 corresponds to a portion of the fuel cell that is close to the entry point for the cathode input flow and close to the exit point for the anode output flow. In locations near corner 484, the total amount of current density may be limited due to the reduced concentration of $H_2$ in the anode, depending on the fuel utilization. However, sufficient $CO_2$ should be present so that any ions transported across the electrolyte substantially correspond to carbonate ions.

Corner 486 corresponds to a portion of the fuel cell that is close to the exit point for the anode output flow and close to the exit point for the cathode output flow. In locations near corner 486, due to the lower concentrations of both $H_2$ (in the anode) and $CO_2$ (in the cathode), little or no current would be expected due to the low driving force for the fuel cell reaction.

Corner 488 corresponds to a portion of the fuel cell that is close to the entry point for the anode input flow and close to the exit point for the cathode output flow. The relatively high availability of hydrogen at locations near corner 488 would be expected to result in substantial current density. However, due to the relatively low concentration of $CO_2$, a substantial amount of transport of hydroxide ions and/or other alternative ions can occur. Depending on the aspect, the substantial amount of alternative ion transport can increase the calculated $CO_2$ utilization by 5% or more, or 10% or more, or 15% or more, or 20% or more. Additionally or alternately, the transference can be 0.95 or less, or 0.90 or less, or 0.85 or less, or 0.80 or less. The transport of substantial amounts of alternative ions across the electrolyte can temporarily allow higher current densities to be maintained at locations near corner 488. However, the transport of alternative ions can also degrade the cathode and/or anode structures, resulting in lower (and possibly no) current density over time at locations near corner 488. It is noted that at lower amounts of alternative ion transport (such as a transference of 0.96 or more, or 0.98 or more), the amount of lifetime degradation is not as severe. As a result, for fuel cells operated under conventional conditions and/or at low current densities, there would be no motivation to perform regeneration of the fuel cell.

It has been discovered that when alternative ion transport becomes significant at one or more locations within the fuel cell, the fuel cell will quickly begin to degrade. This is believed to be due to the one or more locations degrading and not providing any further current density. As region(s) stop contributing to the desired current density, the remaining locations in the fuel cell have to operate at higher current densities in order to maintain a constant overall (average) current density for the fuel cell. This can cause the region for transport of alternative ions to grow, resulting in an expanding portion of the fuel cell that degrades and eventually stops working. Alternatively, degradation of a portion of the fuel cell can result in reduced total current density from the cell, which is also undesirable.

Figure 2:
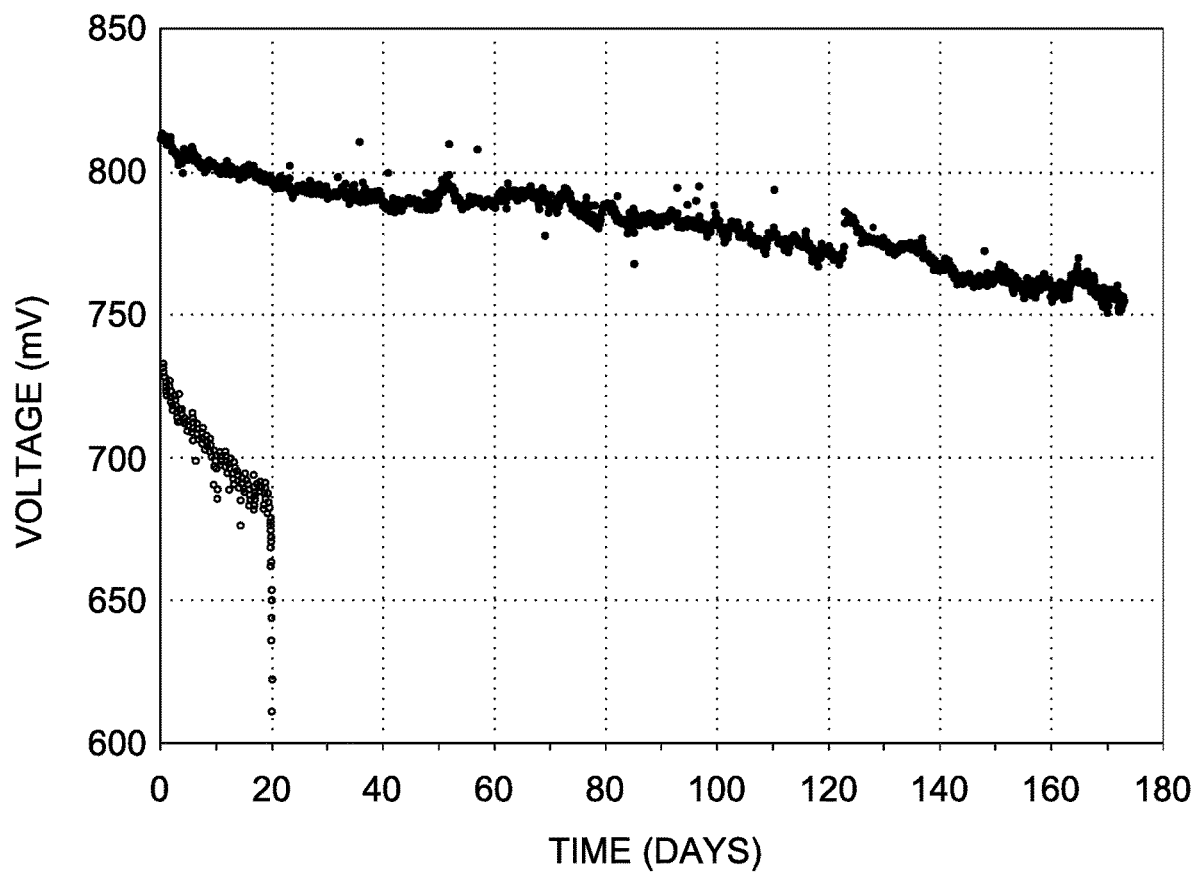
FIG. 2 shows example of average current density over time for fuel cells having different open areas at the cathode surface operated under conditions that result in substantial alternative ion transport.

FIGS. 1 and 2 provide examples of molten carbonate fuel cell lifetimes under conventional conditions (FIG. 1) and under conditions for elevated capture of $CO_2$ (FIG. 2). The fuel cell in FIG. 1 corresponded to a fuel cell with a conventional cathode collector/cathode surface structure, resulting in an open area at the cathode surface of 33%. For the fuel cell in FIG. 1, the fuel cell operating conditions included a cathode input stream with a $CO_2$ concentration of roughly 19 vol %, a current density of 160 $mA/cm^2$, and a measured $CO_2$ utilization of 75%. Under these conditions, the transference was close to 1.0. FIG. 1 shows the voltage for the fuel cell while operating at constant current density over a period of time. As shown in FIG. 1, the voltage of the fuel cell remained relatively constant over a time period of roughly 70 days. This corresponds to the expected behavior of a molten carbonate fuel cell when operating under conventional conditions.

FIG. 2 shows similar voltage over time data for fuel cells that were operated under conditions for elevated $CO_2$ capture. The lower data set in FIG. 2 corresponded to another fuel cell with a conventional cathode collector/cathode surface structure, resulting in an open area at the cathode surface of 33%. The upper data set in FIG. 2 corresponded to a fuel cell with an alternative cathode collector configuration, resulting in an open area at the cathode surface of 50% or more. Under conventional conditions (i.e., de minimis alternative ion transport), the fuel cell with the open area of 50% or more had an operating voltage of 830 mV or higher. The lower data set corresponds to data from a fuel cell using a conventional cathode collector, which resulted in a conventional open area of 33%. Under conventional conditions, the fuel cell with the open area of 33% had an operating voltage between 750 mV and 780 mV.

The operating conditions for the fuel cells in FIG. 2 included a $CO_2$ concentration in the cathode input stream of roughly 4.5 vol %. The fuel cells were operated to maintain an average current density of roughly 100 $mA/cm^2$. The measured $CO_2$ utilization was 90%. However, achieving a measured $CO_2$ utilization of 90% corresponded to larger calculated $CO_2$ utilization based on current density. In particular, for the fuel cell with the open area of 33%, the calculated $CO_2$ utilization was 130%. Under these conditions, a drop in the fuel cell operating voltage to roughly 730 mV was observed almost immediately, with rapid additional decrease. The decline in operating voltage continued for roughly 20 days, at which time the fuel cell stopped working entirely. By contrast, for the fuel cell with the open area of 50% or more at the cathode surface, the calculated $CO_2$ utilization was between 10% and 20% greater than the actual $CO_2$ utilization. For the fuel cell with the open area at the cathode surface of 50% or more, operating with substantial alternative ion transport also resulted in reduction in operating voltage to roughly 810 mV. However, the amount of further degradation over time was less severe, with the fuel cell maintaining an operating voltage greater than 750 mV after 150 days of operation.

FIG. 2 illustrates the difficulty with operating a molten carbonate fuel cell for elevated $CO_2$ capture. Depending on the amount of alternative ion transport that occurs when elevated $CO_2$ capture conditions are used, a fuel cell can potentially quickly degrade to a point where the fuel cell becomes inoperable. Even for the fuel cell with the open area of 50% or more shown in FIG. 2, where the fuel cell was able to maintain operation while performing substantial alternative ion transport, the operating conditions resulted in a substantial amount of voltage drop over time.

Figure 5:
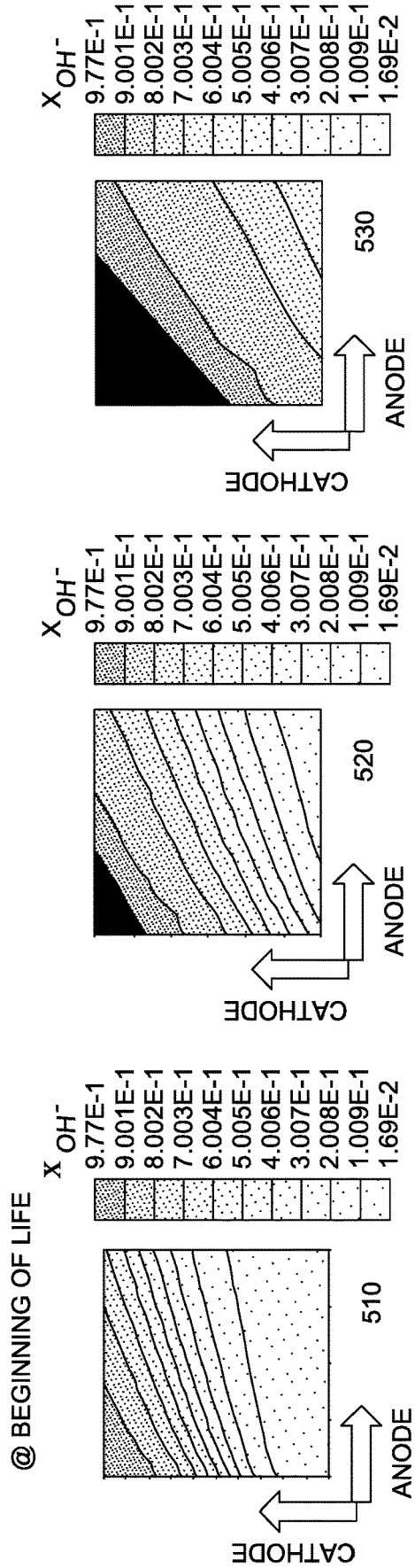
FIG. 5 illustrates an example of changes in the current density profile over time as a fuel cell is deactivated due to alternative ion transport.

FIG. 5 shows a model example of how continued operation of a fuel cell under conditions that result in a region of substantial alternative ion transport may lead to a reduction in the operating lifetime of a fuel cell. The modeled fuel cell in FIG. 5 corresponds to a fuel cell operated in a cross-flow manner, so that the upper left corner of the fuel cell corresponds to a corner adjacent to the anode inlet and the cathode outlet. Thus, the upper left corner in FIG. 5 is analogous to corner 488 in FIG. 4. The modeling of the fuel cell was based on a steady state model created using a commercial process modeling platform, which allowed for determination of the concentration of reactants within the cathode and anode of the model fuel cell during operation.

Without being bound by any particular theory, it is believed that when substantial alternative ion transport occurs, the substantial alternative ion transport can degrade the operation of the fuel cell in a localized area. If the fuel cell is being operated to maintain a constant average current density, the remaining portions of the fuel cell will have to provide higher current density to compensate for the portion of the fuel cell that is no longer generating current density. Because the remaining portions of the fuel cell are operating at higher current density, the voltage, will drop, as shown in FIG. 2. It is believed that the increase in current density will also lead to deactivation or degradation of additional area of the fuel cell, resulting in still higher current density for the remaining portions, and still further deactivation. At some point, the portion of the fuel cell that is not generating current becomes too great, and the fuel cell stops working. This corresponds to the operating voltage dropping to zero in FIG. 2.

Based on the above theory, and based on the reactant concentrations from the model, FIG. 5 shows a representation of the current density for a fuel cell at three different points in time when substantial alternative ion transport is occurring. The left hand representation 510 corresponds to the current density profile at the start of operation and/or at the start of the time period for substantial alternative ion transport. The current density profile in representation 510 corresponds to a current density profile calculated based on the modeled reactant concentrations in the fuel cell. In representation 510, the current density varies across the area of the fuel cell, but all portions of the fuel cell provide a contribution to the total current.

As substantial alternative ion transport continues, the current density can change to the profile shown in middle representation 520. In the middle representation 520, the upper left corner no longer provides any current, due to expected deactivation based on the concentration profiles in the cathode and anode. As a result, the remaining portions of the fuel cell were assigned an increased current density in order to maintain the constant total current density for the fuel cell. This increase in current density is believed to result in alternative ion transport in additional regions near the deactivated region, which leads to further growth of the portion of the fuel cell that provides no current density. Eventually, the fuel cell can reach a state similar to the state shown in right representation 530, where a large percentage of the fuel cell area does not provide any current. Although the exact percentage is not known, it is believed that when the percentage of the fuel cell area that does not provide current is large enough, the fuel cell will stop working.

Regeneration Methods—Shifting of Location of High Density Alternative Ion Transport One option for overcoming the problems associated with high density transport of alternative ions can be to periodically shift the location where this high density transport occurs. An example of a method for shifting the location of the substantial alternative ion transport is to switch the flow direction of the anode or the cathode within the fuel cell. In some aspects, switching or changing the flow direction of the anode and/or cathode can correspond to simply reversing the flow, so that the flow direction or axis for the flow changes by 180°. This can be convenient in situations where the input and output of the anode can be switched, and/or where the input and output of the cathode can be switched. More generally, changing the flow direction for the anode and/or cathode can correspond to changing the axis of flow by 60° or more relative to the initial axis, or 80° or more. Since a 180° change corresponds to reversing the flow direction, it is understood that 180° is the maximum possible change in the flow axis. Such changes in the flow axis are with respect to the plane of the anode or the plane of the cathode. Thus, any changes in the elevation of how the flow is introduced into the anode or cathode are not considered when determining the anode flow axis or the cathode flow axis.

Figure 6:
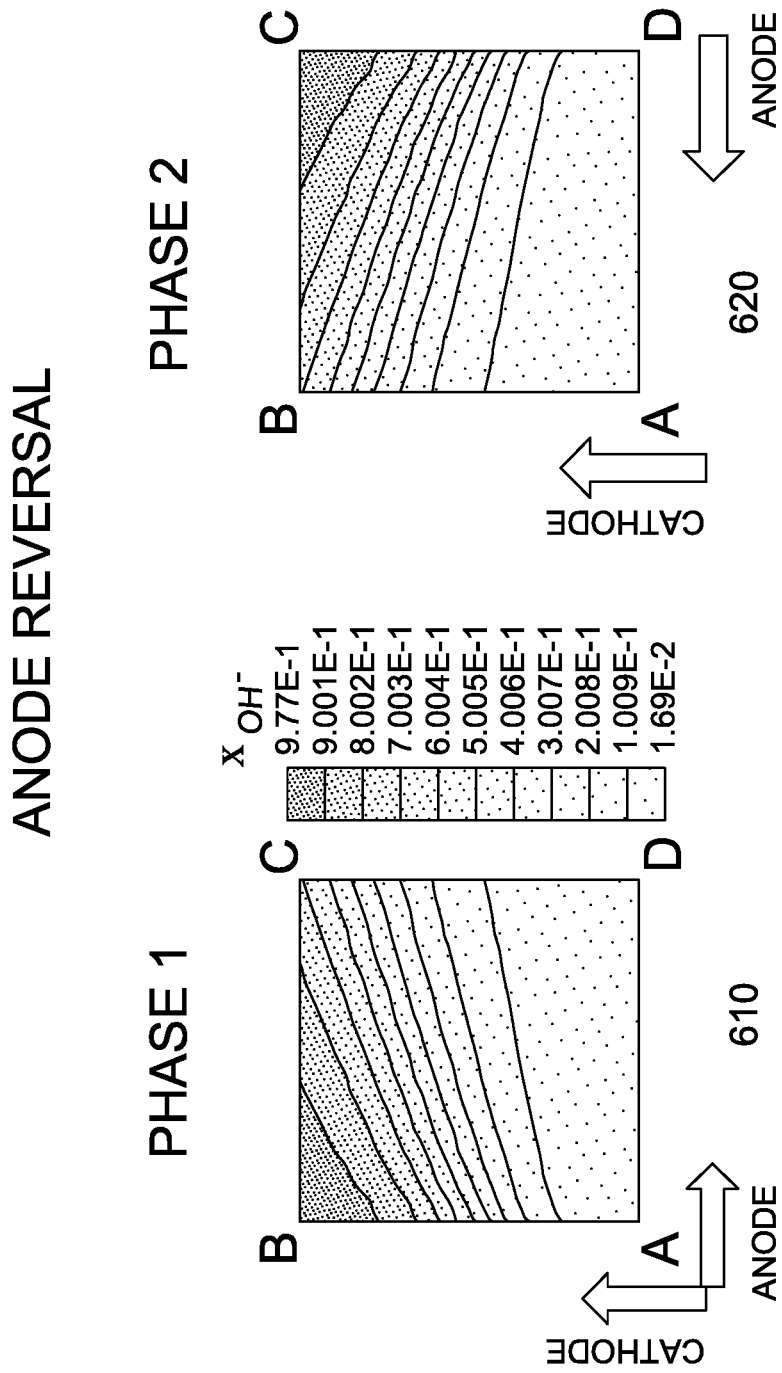
FIG. 6 shows a current density profile for fuel cells operated with different flow patterns.

In a molten carbonate fuel cell with a cross flow configuration, substantial alternative ion transport initially occurs in the corner of the fuel cell that corresponds to the anode inlet (where $H_2$ concentration is highest) and the cathode outlet (where $CO_2$ concentration is lowest). By reversing the direction of flow within the anode, the corner corresponding to the anode inlet plus cathode outlet can be changed to a different corner. FIG. 6 shows representations of current density profiles before and after a change in direction of the anode flow. In representation 610, the upper left corner B is adjacent to the anode inlet and the cathode outlet. If the anode flow is reversed, the corner adjacent to the anode inlet and cathode outlet is moved to corner C, as shown in representation 620. Changing the location of substantial alternative ion transport from corner B to corner C can allow the region of the fuel cell near corner B to recover and resume normal operation, based on the reduction and/or elimination of alternative ion transport. As the area near corner C starts to degrade, the anode flow can be reversed again. This periodic reversal of flow can allow the fuel cell to continue to operate with substantial alternative ion transport while maintaining the operating lifetime of the fuel cell.

Another option can be to reverse the cathode flow instead of the anode flow. Still a third option can be to reverse both the anode flow and the cathode flow. More generally, any change in flow pattern that moves the region of substantial alternative ion transport to a different location in the fuel cell can be effective.

It is noted that the representation shown in FIG. 6 corresponds to a cross-flow configuration. In some aspects, the cathode flow and anode flow can be aligned (co-flow) or can be directly opposing (counter-flow). In this discussion, co-flow corresponds to a configuration where the anode flow axis and the cathode flow axis are aligned to within 20°. In this discussion, counter-flow corresponds to a configuration where the anode flow axis and the cathode flow axis differ by 160° to 180°. In some aspects, cross-flow can correspond to any relative orientation of the anode flow axis and the cathode flow axis that is not co-flow or counter-flow. In other aspects, cross-flow can correspond to a relative orientation of the anode flow axis and the cathode flow axis that is between 45° and 135°.

In a co-flow or counter-flow configuration, modifying the flow direction of the cathode flow may be more effective for allowing fuel cell regeneration. For example, if substantial alternative ion transport occurs in a co-flow configuration, the region of substantial alternative ion transport will correspond to an edge of the fuel cell. That edge will correspond to the edge for both the cathode outlet and the anode outlet. In this type of situation, reversing the direction of anode flow will result in placing the anode inlet adjacent to the edge where substantial alternative ion transport has previously occurred. Therefore, if substantial alternative ion transport occurs in a co-flow or counter-flow situation, reversing the cathode flow may be more effective for allowing the fuel cell to regenerate, as reversing the cathode flow will change the edge of the cell having the lowest $CO_2$ concentration.

Regeneration Methods—Modification of Operating Conditions

Other alternatives for regenerating a fuel cell after substantial alternative ion transport can correspond to modification of the operating conditions for the fuel cell. Options for modifying the operating conditions can include, but are not limited to, a) reducing the $CO_2$ capture rate (i.e., measured $CO_2$ utilization) relative to the current density; b) increasing the cathode flow rate relative to the current density; c) increasing the $CO_2$ concentration in the cathode input stream relative to the capture rate; d) changing the current density for the fuel cell; or e) a combination of two or more of the above. More generally, any convenient modification of the fuel cell operating conditions that results in an increase in the $CO_2$ concentration at the cathode outlet can be beneficial for regeneration of the fuel cell.

In various aspects, any combination of modifications a), b), c), and d) above can result in an increase in the $CO_2$ concentration at the cathode outlet. As an example, one option for modifying conditions relative to the current density is to hold the current density of the fuel cell constant while varying another operating condition. If the average current density for the fuel cell is maintained at a constant level, then a constant number of carbonate ions will be transported across the electrolyte per unit time. Thus, to implement option a) for reducing the $CO_2$ capture rate relative to a constant current density (i.e., increasing the transference), additional $CO_2$ would need to be present within the cathode in order to drive down the $CO_2$ utilization. This could correspond to an increase in the $CO_2$ content of the cathode input stream. Alternatively, this could be achieved by using option b), where the flow rate is increased in the cathode. If the utilization of $CO_2$ per unit time is constant (corresponding to constant current density), then increasing the flow rate of an input stream with constant $CO_2$ content will result in a decrease in $CO_2$ utilization. In various aspects, regenerating the fuel cell by reducing the $CO_2$ capture rate can correspond to reducing the $CO_2$ utilization to 70% or less, or 50% or less, such as down to 10% or possibly still lower.

Option c) provides still another alternative, where increasing the $CO_2$ concentration in the cathode input stream while holding the flow rate constant and holding the current density constant can result in a decrease in $CO_2$ utilization. This could correspond to increasing the $CO_2$ concentration in the cathode input stream to 10 vol % or more, or 15 vol % or more. As an example, one method for increasing the $CO_2$ concentration of a cathode input stream can be based on use of a cathode oxidizer prior to the cathode inlet. A cathode oxidizer can be used to burn fuel to increase the temperature of the cathode input stream prior to entering the cathode of the fuel cell. One option for varying the composition of the cathode input stream can be to use $H_2$ from the fuel cell as at least a portion of the fuel for the cathode oxidizer. When it is desired to increase the $CO_2$ content of the cathode input stream, methane or another carbon-containing fuel can be used in place of at least a portion of the $H_2$.

Although the concepts in options a), b), and c) have been illustrated by holding some operating conditions constant, it is understood that relative changes in operating conditions are sufficient to provide the benefits of the various options. Thus, options a), b), and c), could potentially be used in combination with option d), where reducing the average current density for the fuel cell is used to allow the fuel cell to regenerate. As an example, if the average current density for the fuel cell is reduced while holding other operating conditions constant, the $CO_2$ utilization will also be reduced, leading to an increase in the $CO_2$ concentration at the cathode outlet. Reducing the average current density can be achieved, for example, by adjusting the current draw by the inverter that is typically associated with a fuel cell. In some aspects, the average current density can be reduced by 20 $mA/cm^2$ or more, or 40 $mA/cm^2$ or more. In some aspects, after reducing the average current density, the reduced value can correspond to 50 $mA/cm^2$ or more, or 80 $mA/cm^2$ or more.

When periodically modifying the direction of flow of the cathode and/or the anode, any convenient cycle for modifying the flow direction can be used. Similarly, when modifying the operating conditions, the amount of time spent in each condition can correspond to any convenient amount of time. One option can be to have roughly equal amounts of time in for each direction of flow and/or each condition within the cathode and/or the anode. This can correspond to having a first set of conditions is used for roughly half of the total time of the cycle period, and a second set of conditions is used for the other half of the cycle period. Alternatively, one direction of flow and/or one operating condition within the cathode and/or the anode can correspond to a preferred direction/operating condition, with the reverse direction/ second operating condition being used for a smaller portion of time during a cycle period. Relative to the total cycle time and/or relative to a cycle period, this could correspond to having the fuel cell operate with the first direction of flow/first operating condition for 51% of the time or more, or 60% or more, or 75% or more, or 90% or more, or 95% or more, such as up to 99.9%, or possibly still higher, so long as the percentage of time in the reverse direction/second operating condition is sufficient to substantially maintain the fuel cell lifetime. For example, the fuel can operate with the first direction of flow/first operating condition for 51% to 99.9% of the time, or 51% to 99% of the time, or 60% to 99.9% of the time, or 60% to 99% of the time, or 75% to 99.9% of the time, or 90% to 99.9% of the time, or 95% to 99.9% of the time. This can correspond to operating the cathode flow and/or the anode flow in the reverse direction/ under the second operating condition for 0.1% to 49% of the time, or 1% to 49% of the time, or 3% to 49% of the time, or 10% to 49% of the time, or 20% to 49% of the time.

The length of a cycle period can be any convenient time length that allows for desired operation of a cell (with alternative ion transport) while also allowing the cell to regenerate. Depending on the aspect, the cycle period can be on the order of seconds, or on the order of minutes, or on the order of hours. For example, in some aspects the cycle period can correspond to 0.1 hours to 200 hours, or 0.1 hours to 100 hours, or 0.1 hours to 20 hours, or 1.0 hours to 200 hours, or 1.0 hours to 100 hours, or 1.0 hours to 20 hours. In some aspects, the cycle period can correspond to 0.1 minutes to 200 minutes, or 0.1 minutes to 100 minutes, or 0.1 minutes to 20 minutes, 1.0 minutes to 200 minutes, or 1.0 minutes to 100 minutes, or 1.0 minutes to 20 minutes.

Anode Inputs and Outputs

In various aspects, the anode input stream for an MCFC can include hydrogen, a hydrocarbon such as methane, a hydrocarbonaceous or hydrocarbon-like compound that may contain heteroatoms different from C and H, or a combination thereof. The source of the hydrogen/hydrocarbon/hydrocarbon-like compounds can be referred to as a fuel source. In some aspects, most of the methane (or other hydrocarbon, hydrocarbonaceous, or hydrocarbon-like compound) fed to the anode can typically be fresh methane. In this description, a fresh fuel such as fresh methane refers to a fuel that is not recycled from another fuel cell process. For example, methane recycled from the anode outlet stream back to the anode inlet may not be considered "fresh" methane, and can instead be described as reclaimed methane.

The fuel source used can be shared with other components, such as a turbine that uses a portion of the fuel source to provide a $CO_2$-containing stream for the cathode input. The fuel source input can include water in a proportion to the fuel appropriate for reforming the hydrocarbon (or hydrocarbon-like) compound in the reforming section that generates hydrogen. For example, if methane is the fuel input for reforming to generate $H_2$, the molar ratio of water to fuel can be from about one to one to about ten to one, such as at least about two to one. A ratio of four to one or greater is typical for external reforming, but lower values can be typical for internal reforming. To the degree that $H_2$ is a portion of the fuel source, in some optional aspects no additional water may be needed in the fuel, as the oxidation of $H_2$ at the anode can tend to produce $H_2O$ that can be used for reforming the fuel. The fuel source can also optionally contain components incidental to the fuel source (e.g., a natural gas feed can contain some content of $CO_2$ as an additional component). For example, a natural gas feed can contain $CO_2$, $N_2$, and/or other inert (noble) gases as additional components. Optionally, in some aspects the fuel source may also contain CO, such as CO from a recycled portion of the anode exhaust. An additional or alternate potential source for CO in the fuel into a fuel cell assembly can be CO generated by steam reforming of a hydrocarbon fuel performed on the fuel prior to entering the fuel cell assembly.

More generally, a variety of types of fuel streams may be suitable for use as an anode input stream for the anode of a molten carbonate fuel cell. Some fuel streams can correspond to streams containing hydrocarbons and/or hydrocarbon-like compounds that may also include heteroatoms different from C and H. In this discussion, unless otherwise specified, a reference to a fuel stream containing hydrocarbons for an MCFC anode is defined to include fuel streams containing such hydrocarbon-like compounds. Examples of hydrocarbon (including hydrocarbon-like) fuel streams include natural gas, streams containing C1-C4 carbon compounds (such as methane or ethane), and streams containing heavier C5+ hydrocarbons (including hydrocarbon-like compounds), as well as combinations thereof. Still other additional or alternate examples of potential fuel streams for use in an anode input can include biogas-type streams, such as methane produced from natural (biological) decomposition of organic material.

In some aspects, a molten carbonate fuel cell can be used to process an input fuel stream, such as a natural gas and/or hydrocarbon stream, with a low energy content due to the presence of diluent compounds. For example, some sources of methane and/or natural gas are sources that can include substantial amounts of either $CO_2$ or other inert molecules, such as nitrogen, argon, or helium. Due to the presence of elevated amounts of $CO_2$ and/or inerts, the energy content of a fuel stream based on the source can be reduced. Using a low energy content fuel for a combustion reaction (such as for powering a combustion-powered turbine) can pose difficulties. However, a molten carbonate fuel cell can generate power based on a low energy content fuel source with a reduced or minimal impact on the efficiency of the fuel cell. The presence of additional gas volume can require additional heat for raising the temperature of the fuel to the temperature for reforming and/or the anode reaction. Additionally, due to the equilibrium nature of the water gas shift reaction within a fuel cell anode, the presence of additional $CO_2$ can have an impact on the relative amounts of $H_2$ and CO present in the anode output. However, the inert compounds otherwise can have only a minimal direct impact on the reforming and anode reactions. The amount of $CO_2$ and/or inert compounds in a fuel stream for a molten carbonate fuel cell, when present, can be at least about 1 vol %, such as at least about 2 vol %, or at least about 5 vol %, or at least about 10 vol %, or at least about 15 vol %, or at least about 20 vol %, or at least about 25 vol %, or at least about 30 vol %, or at least about 35 vol %, or at least about 40 vol %, or at least about 45 vol %, or at least about 50 vol %, or at least about 75 vol %. Additionally or alternatively, the amount of $CO_2$ and/or inert compounds in a fuel stream for a molten carbonate fuel cell can be about 90 vol % or less, such as about 75 vol % or less, or about 60 vol % or less, or about 50 vol % or less, or about 40 vol % or less, or about 35 vol % or less.

Yet other examples of potential sources for an anode input stream can correspond to refinery and/or other industrial process output streams. For example, coking is a common process in many refineries for converting heavier compounds to lower boiling ranges. Coking typically produces an off-gas containing a variety of compounds that are gases at room temperature, including CO and various $C_1$-$C_4$ hydrocarbons. This off-gas can be used as at least a portion of an anode input stream. Other refinery off-gas streams can additionally or alternately be suitable for inclusion in an anode input stream, such as light ends ($C_1$-$C_4$) generated during cracking or other refinery processes. Still other suitable refinery streams can additionally or alternatively include refinery streams containing CO or $CO_2$ that also contain $H_2$ and/or reformable fuel compounds.

Still other potential sources for an anode input can additionally or alternatively include streams with increased water content. For example, an ethanol output stream from an ethanol plant (or another type of fermentation process) can include a substantial portion of $H_2O$ prior to final distillation. Such $H_2O$ can typically cause only minimal impact on the operation of a fuel cell. Thus, a fermentation mixture of alcohol (or other fermentation product) and water can be used as at least a portion of an anode input stream.

Biogas, or digester gas, is another additional or alternate potential source for an anode input. Biogas may primarily comprise methane and $CO_2$ and is typically produced by the breakdown or digestion of organic matter. Anaerobic bacteria may be used to digest the organic matter and produce the biogas. Impurities, such as sulfur-containing compounds, may be removed from the biogas prior to use as an anode input.

The output stream from an MCFC anode can include $H_2O$, $CO_2$, CO, and $H_2$. Optionally, the anode output stream could also have unreacted fuel (such as $H_2$ or $CH_4$) or inert compounds in the feed as additional output components. Instead of using this output stream as a fuel source to provide heat for a reforming reaction or as a combustion fuel for heating the cell, one or more separations can be performed on the anode output stream to separate the $CO_2$ from the components with potential value as inputs to another process, such as $H_2$ or CO. The $H_2$ and/or CO can be used as a syngas for chemical synthesis, as a source of hydrogen for chemical reaction, and/or as a fuel with reduced greenhouse gas emissions. Depending on the end use for the hydrogen, carbon monoxide, and/or carbon dioxide, the anode exhaust can be subjected to a variety of gas processing options, including water-gas shift and separation of the components from each other.

Cathode Inputs and Outputs

Conventionally, a molten carbonate fuel cell can be operated based on drawing a desired load while consuming some portion of the fuel in the fuel stream delivered to the anode. The voltage of the fuel cell can then be determined by the load, fuel input to the anode, air and $CO_2$ provided to the cathode, and the internal resistances of the fuel cell. The $CO_2$ to the cathode can be conventionally provided in part by using the anode exhaust as at least a part of the cathode input stream. By contrast, the present invention can use separate/different sources for the anode input and cathode input. By removing any direct link between the composition of the anode input flow and the cathode input flow, additional options become available for operating the fuel cell, such as to generate excess synthesis gas, to improve capture of carbon dioxide, and/or to improve the total efficiency (electrical plus chemical power) of the fuel cell, among others.

In various aspects, an MCFC can be operated to cause alternative ion transport across the electrolyte for the fuel cell. In some aspects involving low $CO_2$-content cathode input streams, the $CO_2$ content of the cathode input stream can be 5.0 vol % or less, or 4.0 vol % or less, such as 1.5 vol % to 5.0 vol %, or 1.5 vol % to 4.0 vol %, or 2.0 vol % to 5.0 vol %, or 2.0 vol % to 4.0 vol %. In other aspects, potentially higher $CO_2$ concentrations in the cathode input stream can be used, if the $CO_2$ utilization is sufficiently high and/or the current density is sufficiently high.

One example of a suitable $CO_2$-containing stream for use as a cathode input flow can be an output or exhaust flow from a combustion source. Examples of combustion sources include, but are not limited to, sources based on combustion of natural gas, combustion of coal, and/or combustion of other hydrocarbon-type fuels (including biologically derived fuels). Additional or alternate sources can include other types of boilers, fired heaters, furnaces, and/or other types of devices that burn carbon-containing fuels in order to heat another substance (such as water or air).

Other potential sources for a cathode input stream can additionally or alternately include sources of bio-produced $CO_2$. This can include, for example, $CO_2$ generated during processing of bio-derived compounds, such as $CO_2$ generated during ethanol production. An additional or alternate example can include $CO_2$ generated by combustion of a bio-produced fuel, such as combustion of lignocellulose. Still other additional or alternate potential $CO_2$ sources can correspond to output or exhaust streams from various industrial processes, such as $CO_2$-containing streams generated by plants for manufacture of steel, cement, and/or paper.

Yet another additional or alternate potential source of $CO_2$ can be $CO_2$-containing streams from a fuel cell. The $CO_2$-containing stream from a fuel cell can correspond to a cathode output stream from a different fuel cell, an anode output stream from a different fuel cell, a recycle stream from the cathode output to the cathode input of a fuel cell, and/or a recycle stream from an anode output to a cathode input of a fuel cell. For example, an MCFC operated in standalone mode under conventional conditions can generate a cathode exhaust with a $CO_2$ concentration of at least about 5 vol %. Such a $CO_2$-containing cathode exhaust could be used as a cathode input for an MCFC operated according to an aspect of the invention. More generally, other types of fuel cells that generate a $CO_2$ output from the cathode exhaust can additionally or alternately be used, as well as other types of $CO_2$-containing streams not generated by a "combustion" reaction and/or by a combustion-powered generator. Optionally but preferably, a $CO_2$-containing stream from another fuel cell can be from another molten carbonate fuel cell. For example, for molten carbonate fuel cells connected in series with respect to the cathodes, the output from the cathode for a first molten carbonate fuel cell can be used as the input to the cathode for a second molten carbonate fuel cell.

In addition to $CO_2$, a cathode input stream can include $O_2$ to provide the components necessary for the cathode reaction. Some cathode input streams can be based on having air as a component. For example, a combustion exhaust stream can be formed by combusting a hydrocarbon fuel in the presence of air. Such a combustion exhaust stream, or another type of cathode input stream having an oxygen content based on inclusion of air, can have an oxygen content of about 20 vol % or less, such as about 15 vol % or less, or about 10 vol % or less. Additionally or alternately, the oxygen content of the cathode input stream can be at least about 4 vol %, such as at least about 6 vol %, or at least about 8 vol %. More generally, a cathode input stream can have a suitable content of oxygen for performing the cathode reaction. In some aspects, this can correspond to an oxygen content of about 5 vol % to about 15 vol %, such as from about 7 vol % to about 9 vol %. For many types of cathode input streams, the combined amount of $CO_2$ and $O_2$ can correspond to less than about 21 vol % of the input stream, such as less than about 15 vol % of the stream or less than about 10 vol % of the stream. An air stream containing oxygen can be combined with a $CO_2$ source that has low oxygen content. For example, the exhaust stream generated by burning coal may include a low oxygen content that can be mixed with air to form a cathode input stream.

In addition to $CO_2$ and $O_2$, a cathode input stream can also be composed of inert/non-reactive species such as $N_2$, $H_2O$, and other typical oxidant (air) components. For example, for a cathode input derived from an exhaust from a combustion reaction, if air is used as part of the oxidant source for the combustion reaction, the exhaust gas can include typical components of air such as $N_2$, $H_2O$, and other compounds in minor amounts that are present in air. Depending on the nature of the fuel source for the combustion reaction, additional species present after combustion based on the fuel source may include one or more of $H_2O$, oxides of nitrogen (NOx) and/or sulfur (SOx), and other compounds either present in the fuel and/or that are partial or complete combustion products of compounds present in the fuel, such as CO. These species may be present in amounts that do not poison the cathode catalyst surfaces though they may reduce the overall cathode activity. Such reductions in performance may be acceptable, or species that interact with the cathode catalyst may be reduced to acceptable levels by known pollutant removal technologies.

The amount of $O_2$ present in a cathode input stream (such as an input cathode stream based on a combustion exhaust) can advantageously be sufficient to provide the oxygen needed for the cathode reaction in the fuel cell. Thus, the volume percentage of $O_2$ can advantageously be at least 0.5 times the amount of $CO_2$ in the exhaust. Optionally, as necessary, additional air can be added to the cathode input to provide a sufficient oxidant for the cathode reaction. When some form of air is used as the oxidant, the amount of $N_2$ in the cathode exhaust can be at least about 78 vol %, e.g., at least about 88 vol %, and/or about 95 vol % or less. In some aspects, the cathode input stream can additionally or alternately contain compounds that are generally viewed as contaminants, such as $H_2S$ or $NH_3$. In other aspects, the cathode input stream can be cleaned to reduce or minimize the content of such contaminants.

A suitable temperature for operation of an MCFC can be between about 450° C. and about 750° C., such as at least about 500° C., e.g., with an inlet temperature of about 550° C. and an outlet temperature of about 625° C. Prior to entering the cathode, heat can be added to or removed from the cathode input stream, if desired, e.g., to provide heat for other processes, such as reforming the fuel input for the anode. For example, if the source for the cathode input stream is a combustion exhaust stream, the combustion exhaust stream may have a temperature greater than a desired temperature for the cathode inlet. In such an aspect, heat can be removed from the combustion exhaust prior to use as the cathode input stream. Alternatively, the combustion exhaust could be at a very low temperature, for example after a wet gas scrubber on a coal-fired boiler, in which case the combustion exhaust can be below about 100° C. Alternatively, the combustion exhaust could be from the exhaust of a gas turbine operated in combined cycle mode, in which the gas can be cooled by raising steam to run a steam turbine for additional power generation. In this case, the gas can be below about 50° C. Heat can be added to a combustion exhaust that is cooler than desired.

Additional Molten Carbonate Fuel Cell Operating Strategies

In some aspects, when operating an MCFC to cause alternative ion transport, the anode of the fuel cell can be operated at a traditional fuel utilization value of roughly 60% to 80%. When attempting to generate electrical power, operating the anode of the fuel cell at a relatively high fuel utilization can be beneficial for improving electrical efficiency (i.e., electrical energy generated per unit of chemical energy consumed by the fuel cell).

In some aspects, it may be beneficial to reduce the electrical efficiency of the fuel cell in order to provide other benefits, such as an increase in the amount of $H_2$ provided in the anode output flow. This can be beneficial, for example, if it is desirable to consume excess heat generated in the fuel cell (or fuel cell stack) by performing additional reforming and/or performing another endothermic reaction. For example, a molten carbonate fuel cell can be operated to provide increased production of syngas and/or hydrogen. The heat required for performing the endothermic reforming reaction can be provided by the exothermic electrochemical reaction in the anode for electricity generation. Rather than attempting to transport the heat generated by the exothermic fuel cell reaction(s) away from the fuel cell, this excess heat can be used in situ as a heat source for reforming and/or another endothermic reaction. This can result in more efficient use of the heat energy and/or a reduced need for additional external or internal heat exchange. This efficient production and use of heat energy, essentially in-situ, can reduce system complexity and components while maintaining advantageous operating conditions. In some aspects, the amount of reforming or other endothermic reaction can be selected to have an endothermic heat requirement comparable to, or even greater than, the amount of excess heat generated by the exothermic reaction(s) rather than significantly less than the heat requirement typically described in the prior art.

Additionally or alternately, the fuel cell can be operated so that the temperature differential between the anode inlet and the anode outlet can be negative rather than positive. Thus, instead of having a temperature increase between the anode inlet and the anode outlet, a sufficient amount of reforming and/or other endothermic reaction can be performed to cause the output stream from the anode outlet to be cooler than the anode inlet temperature. Further additionally or alternately, additional fuel can be supplied to a heater for the fuel cell and/or an internal reforming stage (or other internal endothermic reaction stage) so that the temperature differential between the anode input and the anode output can be smaller than the expected difference based on the relative demand of the endothermic reaction(s) and the combined exothermic heat generation of the cathode combustion reaction and the anode reaction for generating electrical power. In aspects where reforming is used as the endothermic reaction, operating a fuel cell to reform excess fuel can allow for production of increased synthesis gas and/or increased hydrogen relative to conventional fuel cell operation while minimizing the system complexity for heat exchange and reforming. The additional synthesis gas and/or additional hydrogen can then be used in a variety of applications, including chemical synthesis processes and/or collection/repurposing of hydrogen for use as a "clean" fuel.

The amount of heat generated per mole of hydrogen oxidized by the exothermic reaction at the anode can be substantially larger than the amount of heat consumed per mole of hydrogen generated by the reforming reaction. The net reaction for hydrogen in a molten carbonate fuel cell ($H_2+\frac{1}{2}O_2 \Rightarrow H_2O$) can have an enthalpy of reaction of about −285 kJ/mol of hydrogen molecules. At least a portion of this energy can be converted to electrical energy within the fuel cell. However, the difference (approximately) between the enthalpy of reaction and the electrical energy produced by the fuel cell can become heat within the fuel cell. This quantity of energy can alternatively be expressed as the current density (current per unit area) for the cell multiplied by the difference between the theoretical maximum voltage of the fuel cell and the actual voltage, or <current density>* (Vmax−Vact). This quantity of energy is defined as the "waste heat" for a fuel cell. As an example of reforming, the enthalpy of reforming for methane ($CH_4+2H_2O \Rightarrow 4H_2+CO_2$) can be about 250 kJ/mol of methane, or about 62 kJ/mol of hydrogen molecules. From a heat balance standpoint, each hydrogen molecule electrochemically oxidized can generate sufficient heat to generate more than one hydrogen molecule by reforming. In a conventional configuration, this excess heat can result in a substantial temperature difference from anode inlet to anode outlet. Instead of allowing this excess heat to be used for increasing the temperature in the fuel cell, the excess heat can be consumed by performing a matching amount of the reforming reaction. The excess heat generated in the anode can be supplemented with the excess heat generated by the combustion reaction in the fuel cell. More generally, the excess heat can be consumed by performing an endothermic reaction in the fuel cell anode and/or in an endothermic reaction stage heat integrated with the fuel cell.

Depending on the aspect, the amount of reforming and/or other endothermic reaction can be selected relative to the amount of hydrogen reacted in the anode in order to achieve a desired thermal ratio for the fuel cell. As used herein, the "thermal ratio" is defined as the heat produced by exothermic reactions in a fuel cell assembly (including exothermic reactions in both the anode and cathode) divided by the endothermic heat demand of reforming reactions occurring within the fuel cell assembly. Expressed mathematically, the thermal ratio (TH)=$Q_{EX}/Q_{EN}$, where $Q_{EX}$ is the sum of heat produced by exothermic reactions and $Q_{EN}$ is the sum of heat consumed by the endothermic reactions occurring within the fuel cell. Note that the heat produced by the exothermic reactions can correspond to any heat due to reforming reactions, water gas shift reactions, combustion reactions (i.e., oxidation of fuel compounds) in the cathode, and/or the electrochemical reactions in the cell. The heat generated by the electrochemical reactions can be calculated based on the ideal electrochemical potential of the fuel cell reaction across the electrolyte minus the actual output voltage of the fuel cell. For example, the ideal electrochemical potential of the reaction in an MCFC is believed to be about 1.04V based on the net reaction that occurs in the cell. During operation of the MCFC, the cell can typically have an output voltage less than 1.04 V due to various losses. For example, a common output/operating voltage for some molten carbonate fuel cells can be roughly 0.7 V. The heat generated can be equal to the electrochemical potential of the cell (i.e. ~1.04 V) minus the operating voltage. For example, the heat produced by the electrochemical reactions in the cell can be ~0.34 V when the output voltage of ~0.7 V is attained in the fuel cell. Thus, in this scenario, the electrochemical reactions would produce ~0.7 V of electricity and ~0.34 V of heat energy. In such an example, the ~0.7 V of electrical energy is not included as part of $Q_{EX}$. In other words, heat energy is not electrical energy.

In various aspects, a thermal ratio can be determined for any convenient fuel cell structure, such as a fuel cell stack, an individual fuel cell within a fuel cell stack, a fuel cell stack with an integrated reforming stage, a fuel cell stack with an integrated endothermic reaction stage, or a combination thereof. The thermal ratio may also be calculated for different units within a fuel cell stack, such as an assembly of fuel cells or fuel cell stacks. For example, the thermal ratio may be calculated for a fuel cell (or a plurality of fuel cells) within a fuel cell stack along with integrated reforming stages and/or integrated endothermic reaction stage elements in sufficiently close proximity to the fuel cell(s) to be integrated from a heat integration standpoint.

From a heat integration standpoint, a characteristic width in a fuel cell stack can be the height of an individual fuel cell stack element. It is noted that the separate reforming stage and/or a separate endothermic reaction stage could have a different height in the stack than a fuel cell. In such a scenario, the height of a fuel cell element can be used as the characteristic height. In this discussion, an integrated endothermic reaction stage can be defined as a stage heat integrated with one or more fuel cells, so that the integrated endothermic reaction stage can use the heat from the fuel cells as a heat source for reforming. Such an integrated endothermic reaction stage can be defined as being positioned less than 10 times the height of a stack element from fuel cells providing heat to the integrated stage. For example, an integrated endothermic reaction stage (such as a reforming stage) can be positioned less than 10 times the height of a stack element from any fuel cells that are heat integrated, or less than 8 times the height of a stack element, or less than 5 times the height of a stack element, or less than 3 times the height of a stack element. In this discussion, an integrated reforming stage and/or integrated endothermic reaction stage that represents an adjacent stack element to a fuel cell element is defined as being about one stack element height or less away from the adjacent fuel cell element.

A thermal ratio of about 1.3 or less, or about 1.15 or less, or about 1.0 or less, or about 0.95 or less, or about 0.90 or less, or about 0.85 or less, or about 0.80 or less, or about 0.75 of less, can be lower than the thermal ratio typically sought in use of MCFC fuel cells. In aspects of the invention, the thermal ratio can be reduced to increase and/or optimize syngas generation, hydrogen generation, generation of another product via an endothermic reaction, or a combination thereof.

In various aspects of the invention, the operation of the fuel cells can be characterized based on a thermal ratio. Where fuel cells are operated to have a desired thermal ratio, a molten carbonate fuel cell can be operated to have a thermal ratio of about 1.5 or less, for example about 1.3 or less, or about 1.15 or less, or about 1.0 or less, or about 0.95 or less, or about 0.90 or less, or about 0.85 or less, or about 0.80 or less, or about 0.75 or less. Additionally or alternatively, the thermal ratio can be at least about 0.25, or at least about 0.35, or at least about 0.45, or at least about 0.50. Further additionally or alternatively, in some aspects the fuel cell can be operated to have a temperature rise between anode input and anode output of about 40° C. or less, such as about 20° C. or less, or about 10° C. or less. Still further additionally or alternatively, the fuel cell can be operated to have an anode outlet temperature that is from about 10° C. lower to about 10° C. higher than the temperature of the anode inlet. Yet further additionally or alternatively, the fuel cell can be operated to have an anode inlet temperature greater than the anode outlet temperature, such as at least about 5° C. greater, or at least about 10° C. greater, or at least about 20° C. greater, or at least about 25° C. greater. Still further additionally or alternatively, the fuel cell can be operated to have an anode inlet temperature greater than the anode outlet temperature by about 100° C. or less, or about 80° C. or less, or about 60° C. or less, or about 50° C. or less, or about 40° C. or less, or about 30° C. or less, or about 20° C. or less.

Operating a fuel cell with a thermal ratio of less than 1 can cause a temperature drop across the fuel cell. In some aspects, the amount of reforming and/or other endothermic reaction may be limited so that a temperature drop from the anode inlet to the anode outlet can be about 100° C. or less, such as about 80° C. or less, or about 60° C. or less, or about 50° C. or less, or about 40° C. or less, or about 30° C. or less, or about 20° C. or less. Limiting the temperature drop from the anode inlet to the anode outlet can be beneficial, for example, for maintaining a sufficient temperature to allow complete or substantially complete conversion of fuels (by reforming) in the anode. In other aspects, additional heat can be supplied to the fuel cell (such as by heat exchange or combustion of additional fuel) so that the anode inlet temperature is greater than the anode outlet temperature by less than about 100° C. or less, such as about 80° C. or less, or about 60° C. or less, or about 50° C. or less, or about 40° C. or less, or about 30° C. or less, or about 20° C. or less, due to a balancing of the heat consumed by the endothermic reaction and the additional external heat supplied to the fuel cell.

The amount of reforming can additionally or alternately be dependent on the availability of a reformable fuel. For example, if the fuel only comprised $H_2$, no reformation would occur because $H_2$ is already reformed and is not further reformable. The amount of "syngas produced" by a fuel cell can be defined as a difference in the lower heating value (LHV) value of syngas in the anode input versus an LHV value of syngas in the anode output. Syngas produced LHV (sg net)=(LHV(sg out)−LHV(sg in)), where LHV(sg in) and LHV(sg out) refer to the LHV of the syngas in the anode inlet and syngas in the anode outlet streams or flows, respectively. A fuel cell provided with a fuel containing substantial amounts of $H_2$ can be limited in the amount of potential syngas production, since the fuel contains substantial amounts of already reformed $H_2$, as opposed to containing additional reformable fuel. The lower heating value is defined as the enthalpy of combustion of a fuel component to vapor phase, fully oxidized products (i.e., vapor phase $CO_2$ and $H_2O$ product). For example, any $CO_2$ present in an anode input stream does not contribute to the fuel content of the anode input, since $CO_2$ is already fully oxidized. For this definition, the amount of oxidation occurring in the anode due to the anode fuel cell reaction is defined as oxidation of $H_2$ in the anode as part of the electrochemical reaction in the anode.

An example of a method for operating a fuel cell with a reduced thermal ratio can be a method where excess reforming of fuel is performed in order to balance the generation and consumption of heat in the fuel cell and/or consume more heat than is generated. Reforming a reformable fuel to form $H_2$ and/or CO can be an endothermic process, while the anode electrochemical oxidation reaction and the cathode combustion reaction(s) can be exothermic. During conventional fuel cell operation, the amount of reforming needed to supply the feed components for fuel cell operation can typically consume less heat than the amount of heat generated by the anode oxidation reaction. For example, conventional operation at a fuel utilization of about 70% or about 75% produces a thermal ratio substantially greater than 1, such as a thermal ratio of at least about 1.4 or greater, or 1.5 or greater. As a result, the output streams for the fuel cell can be hotter than the input streams. Instead of this type of conventional operation, the amount of fuel reformed in the reforming stages associated with the anode can be increased. For example, additional fuel can be reformed so that the heat generated by the exothermic fuel cell reactions can either be (roughly) balanced by the heat consumed in reforming and/or consume more heat than is generated. This can result in a substantial excess of hydrogen relative to the amount oxidized in the anode for electrical power generation and result in a thermal ratio of about 1.0 or less, such as about 0.95 or less, or about 0.90 or less, or about 0.85 or less, or about 0.80 or less, or about 0.75 or less.

Either hydrogen or syngas can be withdrawn from the anode exhaust as a chemical energy output. Hydrogen can be used as a clean fuel without generating greenhouse gases when it is burned or combusted. Instead, for hydrogen generated by reforming of hydrocarbons (or hydrocarbonaceous compounds), the $CO_2$ will have already been "captured" in the anode loop. Additionally, hydrogen can be a valuable input for a variety of refinery processes and/or other synthesis processes. Syngas can also be a valuable input for a variety of processes. In addition to having fuel value, syngas can be used as a feedstock for producing other higher value products, such as by using syngas as an input for Fischer-Tropsch synthesis and/or methanol synthesis processes.

In some aspects, the reformable hydrogen content of reformable fuel in the input stream delivered to the anode and/or to a reforming stage associated with the anode can be at least about 50% greater than the net amount of hydrogen reacted at the anode, such as at least about 75% greater or at least about 100% greater. Additionally or alternatively, the reformable hydrogen content of fuel in the input stream delivered to the anode and/or to a reforming stage associated with the anode can be at least about 50% greater than the net amount of hydrogen reacted at the anode, such as at least about 75% greater or at least about 100% greater. In various aspects, a ratio of the reformable hydrogen content of the reformable fuel in the fuel stream relative to an amount of hydrogen reacted in the anode can be at least about 1.5:1, or at least about 2.0:1, or at least about 2.5:1, or at least about 3.0:1. Additionally or alternatively, the ratio of reformable hydrogen content of the reformable fuel in the fuel stream relative to the amount of hydrogen reacted in the anode can be about 20:1 or less, such as about 15:1 or less or about 10:1 or less. In one aspect, it is contemplated that less than 100% of the reformable hydrogen content in the anode inlet stream can be converted to hydrogen. For example, at least about 80% of the reformable hydrogen content in an anode inlet stream can be converted to hydrogen in the anode and/or in an associated reforming stage(s), such as at least about 85%, or at least about 90%. Additionally or alternatively, the amount of reformable fuel delivered to the anode can be characterized based on the Lower Heating Value (LHV) of the reformable fuel relative to the LHV of the hydrogen oxidized in the anode. This can be referred to as a reformable fuel surplus ratio. In various aspects, the reformable fuel surplus ratio can be at least about 2.0, such as at least about 2.5, or at least about 3.0, or at least about 4.0. Additionally or alternatively, the reformable fuel surplus ratio can be about 25.0 or less, such as about 20.0 or less, or about 15.0 or less, or about 10.0 or less.

Example 1—Regeneration of Fuel Cell by Variation in Operating Conditions

To illustrate the benefits of regenerating a molten carbonate fuel cell when operating under conditions that result in substantial alternative ion transport, a fuel cell was operated under a variety of operating conditions. For a portion of the time, the fuel cell was operated under conditions that resulted in substantial alternative ion transport. Between each set of conditions for substantial alternative ion transport, the fuel cell was operated under conventional conditions to allow for regeneration.

Figure 7:
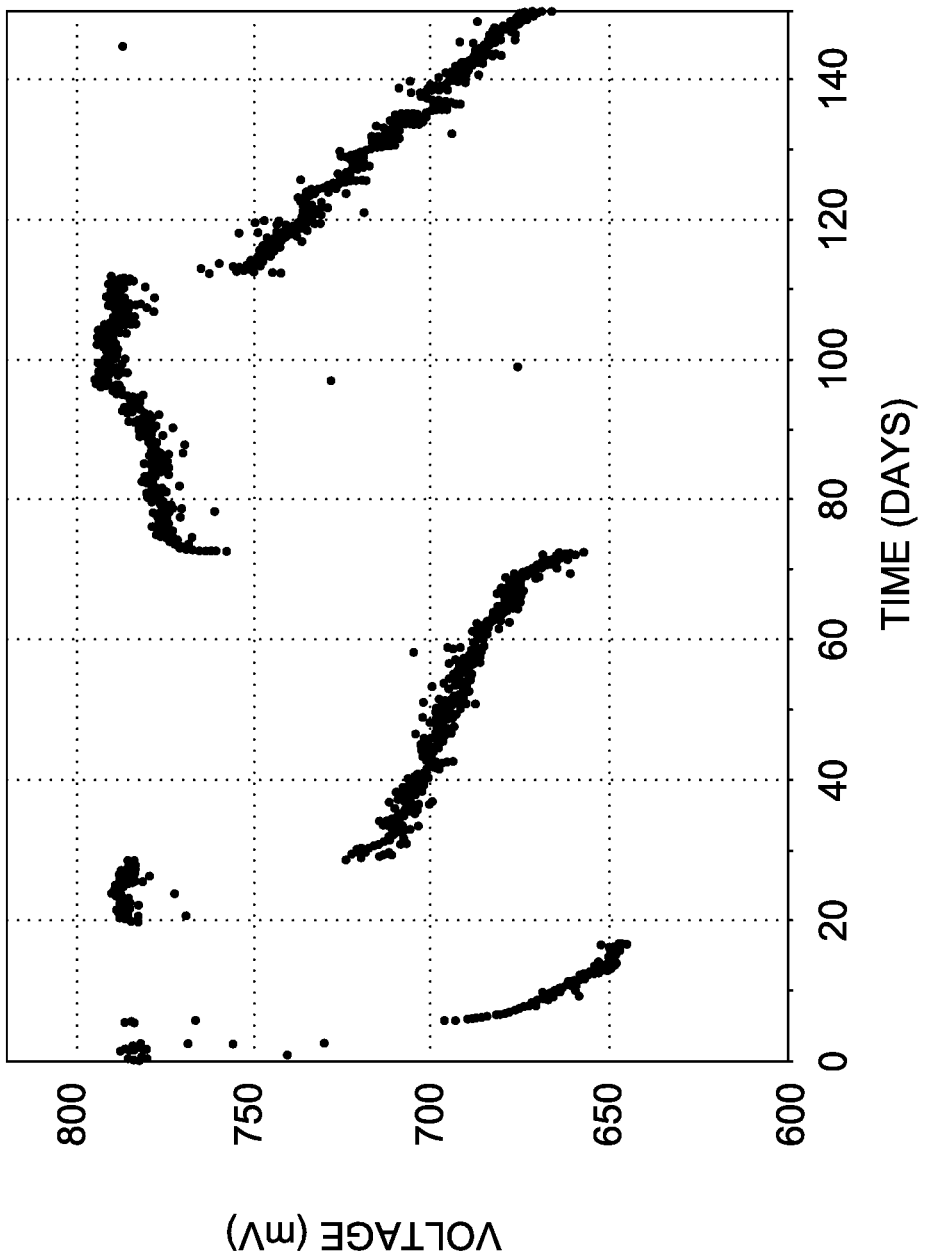
FIG. 7 shows average current density over time for a fuel cell operated under conditions for substantial alternative ion transport and conditions for fuel cell regeneration.

FIG. 7 shows the results from operating the fuel cell to have substantial alternative ion transport for periods of time, with intervening periods of conventional operation. The molten carbonate fuel cell used to generate FIG. 7 included a cathode collector that resulted in an open area for the cathode surface of 50% or more. In FIG. 7, six time periods of operation are shown. For the fuel cell in FIG. 7, the operating voltage for the fuel cell under conventional conditions was roughly 0.78 V. This is shown, for example, in the data points for days 1-5 in FIG. 7. In the second time period, corresponding to days 6-17, the fuel cell was operated with a cathode input stream containing 4.5 vol % $CO_2$. During the second time period, the average current density for the fuel cell was 200 mA/cm². Based on the flow rate into the cathode, this corresponded to a measured $CO_2$ utilization of roughly 90% and a transference of less than 0.90. As shown in FIG. 7, during the second time period, the voltage of the fuel cell decreased substantially, from an initial operating voltage on day 6 of roughly 0.70 V to a value on day 17 of roughly 0.65 V. It is noted that operating with alternative ion transport is expected to cause some reduction in operating voltage, due to the lower electrochemical potential of the alternative reactions based on hydroxide ions.

During the next time period, corresponding to days 18-29, the concentration of the cathode input stream was increased to 17 vol % while maintaining the same flow rate and the same current density of roughly 200 mA/cm². By increasing the concentration of $CO_2$ in the cathode input stream by almost a factor of 4, the measured $CO_2$ utilization was correspondingly reduced to less than 50%, while the transference increased to be substantially 1.0. As shown in FIG. 7, this resulted in an increase in operating voltage to the initial value of roughly 0.78 V, which the fuel cell maintained during the time period.

During the fourth time period, corresponding to days 30-73, the fuel cell was again operated to cause substantial alternative ion transport. The average current density was set at 180 mA/cm² while the $CO_2$ concentration in the cathode input stream was decreased to 4.5 vol %. The conditions corresponded to a measured $CO_2$ utilization in the fuel cell of roughly 90% and a transference of less than 0.90. Under these conditions, the operating voltage was initially near 0.72 V at day 30. This is higher than the operating voltage at the beginning of the second time period, due to the lower amount of alternative ion transport that would be required to achieve a current density of 180 mA/cm² versus 200 mA/cm². Over time, the operating voltage in the fourth time period three dropped to a final value near 0.66 V. The slope of the voltage drop was relatively constant for roughly 40 days, but then started to decline more rapidly during the final few days of the time period. This was believed to be an indication that the fuel cell was approaching a state where the fuel cell would stop working altogether.

The operating conditions were then modified in the fifth time period (days 74-110) to regenerate the fuel cell. The $CO_2$ concentration was increased to 17 vol % while maintaining the average current density of roughly 180 mA/cm². This corresponded to a measured $CO_2$ utilization in the fuel cell of less than 50% and a transference of roughly 1.0. Due to the severe degradation of the fuel cell during the fourth time period, the operating voltage at the beginning of the fifth time period was only 0.76. Over time, however, the fuel cell continued to regenerate, finally achieving and maintaining an operating voltage of roughly 0.78 V, similar to the operating voltage in the first time period and third time period. This is believed to demonstrate the ability to regenerate a fuel cell even after operating the fuel cell with substantial alternative ion transport for extended periods of time.

The regeneration of the fuel cell is further illustrated by the behavior of the fuel cell in the sixth time period, corresponding to days 111-150. During the sixth time period, the $CO_2$ concentration in the cathode input stream was reduced to 4.5 vol %, while the average current density was set at 150 mA/cm². This resulted in an operating voltage of roughly 0.76 V at the beginning of the sixth time period. Over time, the operating voltage dropped to a value near 0.67 V.

It is noted that for other fuel cells, additional cycles were performed of operating with alternative ion transport followed by operation with de minimis alternative ion transport or less. It was found that fuel cells can continue to be cycled through conditions for alternative ion transport and conditions for regeneration for a large number of cycles without any apparent loss in the operating voltage under conventional conditions.

It is noted that the behavior of the fuel cell in FIG. 2 with an open area of 33% at an average current density of 100 mA/cm$^2$ has some qualitative similarity with the behavior of the fuel cell in FIG. 7 (open area of 50% or more) when operated at 200 mA/cm$^2$. Without being bound by any particular theory, it is believed that changing the open area at the cathode surface can modify the amount of alternative ion transport that occurs for a given set of operating conditions. The regeneration methods described herein (changing flow and/or changing operating conditions) are believed to be effective regardless of the open area at the cathode. However, the frequency of regeneration may be more or less frequent depending on the open area at the cathode surface and the operating conditions for a given fuel cell.

Example 2—Regeneration of Fuel Cell by Variation in Operating Conditions

To illustrate another example of the benefits of regenerating a molten carbonate fuel cell when operating under conditions that result in substantial alternative ion transport, three separate fuel cells were operated under $CO_2$ capture conditions at various average current densities. The fuel cells were operated with a cathode input stream containing 4.5 vol % $CO_2$ and a measured $CO_2$ utilization rate of approximately 90%.

Figure 8:
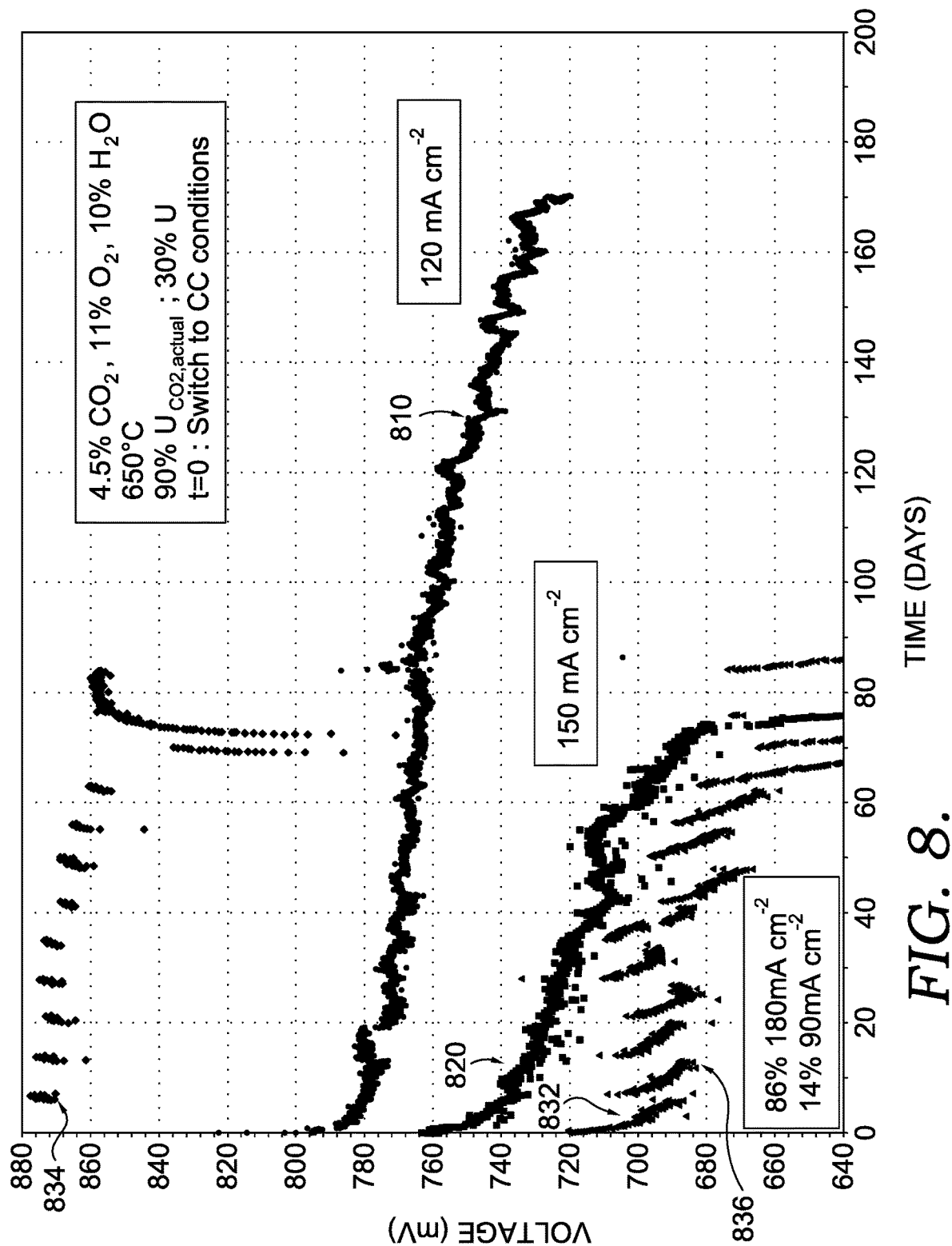
FIG. 8 shows average current density over time for three different fuel cells, with one fuel cell operated under conditions for substantial alternative ion transport and conditions for fuel cell regeneration.

FIG. 8 shows the results of operating these three fuel cells in their respective conditions. A first fuel cell was operated conventionally at an average current density of 120 mA/cm$^2$, where under the operating conditions specified above, the operating voltage was initially near 0.82 V at day 0 and quickly dropped down to approximately 0.79 V within 1-2 days. After over 160 days, the operating voltage had dropped to approximately 0.72 V. Collectively, the individual voltage measurements for the first fuel cell can be identified by the trend line 810 in FIG. 8.

A second fuel cell was operated conventionally at an average current density of 150 mA/cm$^2$, where under the operating conditions specified above, the operating voltage was initially near 0.76 V at day 0 and quickly dropped down to approximately 0.75 V within 1-2 days. At about 75 days, the operating voltage had dropped to approximately 0.67 V. Collectively, the individual voltage measurements for the second fuel cell can be identified by the trend line 820 in FIG. 8.

A third fuel cell was operated under a variety of operating conditions. For a portion of the time, this third fuel cell was operated under conditions that resulted in substantial alternative ion transport. Between each set of conditions for substantial alternative ion transport, the third fuel cell was operated under conventional conditions to allow for regeneration. 86% of the time the third fuel cell was operated at an average current density of 180 mA/cm$^2$, and for 14% of the time operated at an average current density of 90 mA/cm$^2$, with an overall pulsed fuel cell average current density of 167 mA/cm$^2$. Initially, the third fuel cell began operating to cause substantial alternative ion transport and exhibited an operating voltage that was initially near 0.72 V at day 0 and quickly dropped down to approximately 0.69 V within approximately 4-5 days, collectively designated by the trend line 832 in FIG. 8. The third fuel cell was then operated under conventional conditions to allow for regeneration, where at approximately days 5-6 the fuel cell exhibited an operating voltage between 0.87 V and 0.88 V, as seen in trend line 834 of FIG. 8. Subsequently, the third fuel cell was then operated to cause substantial alternative ion transport and exhibited an operating voltage of approximately 0.71 at days 6-7 that continued to fall at about day 11 to approximately 0.69 V, as seen in trend line 836 of FIG. 8. The third fuel cell continued to operate under conditions of alternative ion transport for short periods of time with intervening regeneration under conventional conditions.

Based on the decline in operating voltage exhibited in the first and second fuel cells, with average current densities of 120 mA/cm$^2$ and 150 mA/cm$^2$, respectively, it was expected that the third fuel cell operating under the various conditions described herein (e.g., the alternating substantial alternative ion transport and regeneration periods) would have died by about 20 days. However, unexpectedly, the third fuel cell was able to maintain operation beyond 80 days.

ADDITIONAL EMBODIMENTS

Embodiment 1

A method for producing electricity, the method comprising: operating a molten carbonate fuel cell comprising an anode and a cathode, for a first time period, at a first operating condition comprising a first transference of 0.95 or less (or 0.90 or less) and a first average current density of 60 mA/cm$^2$ or more, to generate an anode exhaust comprising $H_2$, CO, and $CO_2$, and a cathode exhaust comprising 2.0 vol % or less $CO_2$, 1.0 vol % or more $O_2$, and 1.0 vol % or more $H_2O$; and operating the molten carbonate fuel cell, for a second time period, at a second operating condition comprising a second transference of greater than 0.95 to generate an anode exhaust and a cathode exhaust.

Embodiment 2

The method of any of the above embodiments, wherein the second operating condition comprises one or more of a) a second measured $CO_2$ utilization of 70% or less, b) a cathode input stream having a $CO_2$ concentration of 15 vol % or more, c) a second average current density lower than the first average current density by 20 mA/cm$^2$ or more, and d) a cathode exhaust comprising a $CO_2$ content of 2.0 vol % or more.

Embodiment 3

The method of Embodiment 2, i) wherein operating at the second $CO_2$ utilization of 70% or less comprises increasing a flow rate of the cathode input gas into the cathode while maintaining the first average current density; ii) wherein the first operating condition comprises a first flow rate for the cathode input stream, and wherein the second operating condition comprises the first cathode input stream, the first flow rate, and the second average current density; or iii) a combination of i) and ii).

Embodiment 4

A method for producing electricity, the method comprising: introducing an anode input stream into an anode of a molten carbonate fuel cell along a first anode axis; introducing a cathode input stream comprising $O_2$, $CO_2$, and $H_2O$ into a cathode of the molten carbonate fuel cell along a first cathode axis; operating the molten carbonate fuel cell, for a first time period, at a first operating condition comprising a first transference of 0.95 or less and a first average current density of 60 mA/cm² or more, to generate an anode exhaust comprising $H_2$, CO, and $CO_2$, and a cathode exhaust comprising 2.0 vol % or less $CO_2$, 1.0 vol % or more $O_2$, and 1.0 vol % or more $H_2O$; changing the flow direction of a) the anode input stream to correspond to a second anode axis, b) the cathode input stream to correspond to a second cathode axis, or c) a combination of a) and b); and operating the molten carbonate fuel cell, for a second time period, at a second operating condition comprising a second transference of 0.95 or less and a second average current density of 60 mA/cm² or more, to generate an anode exhaust comprising $H_2$, CO, and $CO_2$, and a cathode exhaust comprising 2.0 vol % or less $CO_2$, 1.0 vol % or more $O_2$, and 1.0 vol % or more $H_2O$, the second operating condition further comprising the changed flow direction.

Embodiment 5

A method for producing electricity, the method comprising: introducing a first anode input stream into an anode of the molten carbonate fuel cell along a first anode axis; introducing a first cathode input stream comprising $O_2$, $CO_2$, and $H_2O$ into a cathode of the molten carbonate fuel cell along a first cathode axis; operating the molten carbonate fuel cell, for a first time period, at a first operating condition comprising a first transference of 0.95 or less and a first average current density of 60 mA/cm² or more, to generate an anode exhaust comprising $H_2$, CO, and $CO_2$, and a cathode exhaust comprising 2.0 vol % or less $CO_2$, 1.0 vol % or more $O_2$, and 1.0 vol % or more $H_2O$; and operating the molten carbonate fuel cell, for a second time period, at a second operating condition comprising a second transference and a second average current density to generate a second anode exhaust and a second cathode exhaust, the second operating condition comprising one or more of: i) the second $CO_2$ transference being greater than 0.95 (or 0.98 or more), ii) a cathode input stream having a $CO_2$ concentration of 15 vol % or more, iii) the second average current density being lower than the first average current density by 20 mA/cm² or more, iv) a cathode exhaust comprising a $CO_2$ content of 2.0 vol % or more, v) introducing a second anode input stream into the anode along a second anode axis, and vi) introducing a second cathode input stream into the cathode along a second cathode axis.

Embodiment 6

The method of Embodiment 4 or 5, wherein the first anode axis and the first cathode axis comprise a cross-flow configuration.

Embodiment 7

The method of any of Embodiments 4 to 6, wherein the second anode axis is rotated relative to the first anode axis by 80° or more; or wherein the second cathode axis is rotated relative to the first cathode axis by 80° or more, the first anode axis optionally being substantially co-linear with at least one of the first cathode axis and the second cathode axis.

Embodiment 8

The method of any of the above embodiments, wherein the first operating condition comprises a first measured $CO_2$ utilization of 75% or more, a cathode input stream having a $CO_2$ concentration of 10 vol % or less, or a combination thereof.

Embodiment 9

The method of any of the above embodiments, wherein the second transference is 0.98 or more.

Embodiment 10

The method of any of the above embodiments, further comprising: operating the molten carbonate fuel cell, for a third time period, at a third operating condition comprising a third transference of 0.95 or less (or 0.90 or less) and a third average current density of 60 mA/cm² or more, to generate an anode exhaust comprising $H_2$, CO, and $CO_2$, and a cathode exhaust comprising 2.0 vol % or less $CO_2$, 1.0 vol % or more $O_2$, and 1.0 vol % or more $H_2O$, wherein optionally the third operating condition is substantially the same as the first operating condition.

Embodiment 11

The method of any of the above embodiments, wherein the first time period and the second time period comprise a cycle period, the first time period comprising 51% or more of the cycle period (or 60%-99%, or 75%-99%, or 90%-99%).

Embodiment 12

The method of any of the above embodiments, wherein the first average current density is 150 mA/cm² or more (or 170 mA/cm² or more, or 200 mA/cm² or more), or wherein the second average current density is 60 mA/cm² or more (or 80 mA/cm² or more), or a combination thereof.

Embodiment 13

The method of any of the above embodiments, wherein the cathode comprises a cathode surface having an open area of 45% or more (or 50% or more, or 55% or more, or 60% or more).

Embodiment 14

The method of any of the above embodiments, wherein the first operating condition comprises a cathode input stream comprising 5.0 vol % or less of $CO_2$ (or 4.0 vol % or less), or wherein the first operating condition comprises a cathode exhaust comprising 1.0 vol % or less of $CO_2$, or a combination thereof.

Embodiment 15

The method of any of the above embodiments, further comprising: introducing an anode input stream into the anode of a molten carbonate fuel cell; and introducing a cathode input stream comprising $O_2$, $CO_2$, and $H_2O$ into the cathode of the molten carbonate fuel cell.

ALTERNATIVE EMBODIMENTS

Alternative Embodiment 1

A method for producing electricity, the method comprising: introducing a first anode input stream (optionally comprising $H_2$) into an anode of the molten carbonate fuel cell along a first anode axis; introducing a first cathode input stream comprising $O_2$, $CO_2$, and $H_2O$ into a cathode of the molten carbonate fuel cell along a first cathode axis; operating the molten carbonate fuel cell, for a first time period, at a first operating condition to generate a first anode exhaust and a first cathode exhaust, the first operating condition comprising a first measured $CO_2$ utilization of 70% or more and a first average current density of 80 mA/cm² or more, to generate an anode exhaust comprising $H_2$, CO, and $CO_2$, and a cathode exhaust comprising $CO_2$ an $O_2$ content of 1.0 vol % or more, and an $H_2O$ content of 1.0 vol % or more; and operating the molten carbonate fuel cell, for a second time period, at a second operating condition to generate a second anode exhaust and a second cathode exhaust, the second operating condition comprising a second measured $CO_2$ utilization and a second average current density, the second operating condition further comprising one or more of: i) the second measured $CO_2$ utilization being 70% or less (or 65% or less), ii) a cathode input stream having a $CO_2$ concentration of 10 vol % or more, iii) the second average current density being lower than the first average current density by 20 mA/cm² or more, iv) a cathode exhaust comprising a $CO_2$ content of 2.0 vol % or more, v) introducing a second anode input stream into the anode along a second anode axis, and vi) introducing a second cathode input stream into the cathode along a second cathode axis, wherein, during the first time period, a calculated $CO_2$ utilization calculated based on the first average current density is greater than the first measured $CO_2$ utilization by 5.0% or more (or 10% or more, or 20% or more).

Alternative Embodiment 2

The method of any of the above alternative embodiments, wherein during the second time period, a second calculated $CO_2$ utilization calculated based on the second average current density is different from the second measured $CO_2$ utilization by 2.0% or less, or wherein during the second time the second calculated $CO_2$ utilization is greater than the second measured $CO_2$ utilization by 5.0% or more.

Alternative Embodiment 3

The method of any of the above alternative embodiments, further comprising: operating the molten carbonate fuel cell, for a third time period, at a third operating condition comprising a third measured $CO_2$ utilization of 70% or more and a third average current density of 80 mA/cm² or more, to generate an anode exhaust comprising $H_2$, CO, and $CO_2$, and a cathode exhaust comprising a $CO_2$, an $O_2$ content of 1.0 vol % or more, and an $H_2O$ content of 1.0 vol % or more, the third operating condition further comprising the first anode flow direction and the first cathode flow direction, a third calculated $CO_2$ utilization calculated based on the third average current density being greater than the third measured $CO_2$ utilization by 5.0% or more, the third operating condition optionally being substantially the same as the first operating condition.

Alternative Embodiment 4

The method of any of the above alternative embodiments, wherein the first time period and the second time period comprise a cycle period, the first time period comprising 51%-99% of the cycle period (or 60%-99%, or 75%-99%, or 90%-99%).

Alternative Embodiment 5

The method of any of the above alternative embodiments, a) wherein the first measured $CO_2$ utilization is 75% or more (or 80% or more, or 90% or more); b) wherein the first operating condition comprises a first average current density of 120 mA/cm² or more (or 150 mA/cm² or more, or 180 mA/cm² or more); c) wherein the first operating condition comprises a voltage drop across the cathode of 0.4 V or less, an operating voltage of 0.55 V or more, or a combination thereof; d) wherein the second operating condition comprises a second average current density of 80 mA/cm² or more; e) a combination of two or more of a)-d); or f) a combination of three or more of a)-d).

Alternative Embodiment 6

The method of any of the above alternative embodiments, wherein the first operating condition comprises a cathode input stream comprising 5.0 vol % or less of $CO_2$ (or 4.0 vol % or less), or wherein the first operating condition comprises a cathode exhaust comprising 1.0 vol % or less of $CO_2$, or a combination thereof.

Alternative Embodiment 7

The method of any of the above Alternative embodiments, i) wherein operating at the second measured $CO_2$ utilization of 70% or less comprises increasing a flow rate of the cathode input gas into the cathode while maintaining the first average current density; ii) wherein the first operating condition comprises a first flow rate for the cathode input stream, and wherein the second operating condition comprises the first cathode input stream, the first flow rate, and the second average current density; iii) wherein the second operating condition comprises a cathode input stream comprising a $CO_2$ concentration of 15 vol % or more; or d) a combination of two or more of i)-iii).

Alternative Embodiment 8

The method of any of the above Alternative embodiments, wherein the first anode axis and the first cathode axis comprise a cross-flow configuration; or wherein the first anode axis is substantially co-linear with at least one of the first cathode axis and the second cathode axis.

Alternative Embodiment 9

The method of any of the above Alternative embodiments, wherein changing the flow direction comprises changing the flow direction of the anode input stream, the second anode axis being rotated relative to the first anode axis by 80° or more; or wherein changing the flow direction comprises changing the flow direction of the cathode input stream, the second cathode axis being rotated relative to the first cathode axis by 80° or more; or a combination thereof.

Alternative Embodiment 10

A method for producing electricity, the method comprising: introducing an anode input stream (optionally comprising $H_2$) into an anode of a molten carbonate fuel cell along a first anode axis; introducing a cathode input stream comprising $O_2$ and 5.0 vol % or less $CO_2$ into a cathode of the molten carbonate fuel cell along a first cathode axis; operating the molten carbonate fuel cell, for a first time period, at a first operating condition comprising a first measured $CO_2$ utilization of 70% or more and a first average current density of 80 mA/cm² or more, to generate an anode exhaust comprising $H_2$, CO, and $CO_2$, and a cathode exhaust comprising a $CO_2$ content of 1.0 vol % or less, an $O_2$ content of 1.0 vol % or more, and an $H_2O$ content of 1.0 vol % or more; changing the flow direction of a) the anode input stream to correspond to a second anode axis, b) the cathode input stream to correspond to a second cathode axis, or c) a combination of a) and b); and operating the molten carbonate fuel cell, for a second time period, at a second operating condition comprising a second measured $CO_2$ utilization of 70% or more and a second average current density of 80 mA/cm² or more, to generate an anode exhaust comprising $H_2$, CO, and $CO_2$, and a cathode exhaust comprising a $CO_2$ content of 1.0 vol % or less, an $O_2$ content of 1.0 vol % or more, and an $H_2O$ content of 1.0 vol % or more, the second operating condition further comprising the changed flow direction, wherein, during the first time period, a calculated $CO_2$ utilization calculated based on the first average current density is greater than the first $CO_2$ utilization.

Alternative Embodiment 11

A method for producing electricity, the method comprising: introducing an anode input stream (optionally comprising $H_2$) into an anode of a molten carbonate fuel cell; introducing a cathode input stream comprising $O_2$ and 5.0 vol % or less $CO_2$ into a cathode of the molten carbonate fuel cell; operating the molten carbonate fuel cell, for a first time period, at a first operating condition comprising a first measured $CO_2$ utilization of 70% or more and a first average current density of 80 mA/cm² or more, to generate an anode exhaust comprising $H_2$, CO, and $CO_2$, and a cathode exhaust comprising a $CO_2$ content of 1.0 vol % or less and an $O_2$ content of 1.0 vol % or more; and operating the molten carbonate fuel cell, for a second time period, at a second operating condition comprising a second measured $CO_2$ utilization and a second average current density to generate an anode exhaust and a cathode exhaust, the second operating condition comprising one or more of a) the second measured $CO_2$ utilization being 70% or less (or 65% or less), b) a cathode input stream having a $CO_2$ concentration of 10 vol % or more, c) the second average current density being lower than the first average current density by 20 mA/cm² or more, and d) a cathode exhaust comprising a $CO_2$ content of 2.0 vol % or more, wherein, during the first time period, a calculated $CO_2$ utilization calculated based on the first average current density is greater than the first measured $CO_2$ utilization, the second average current density optionally being 60 mA/cm² or more (or 80 mA/cm² or more).

Alternative Embodiment 12

The method of Alternative Embodiment 10 or 11, further comprising: operating the molten carbonate fuel cell, for a third time period, at a third operating condition comprising a third measured $CO_2$ utilization of 70% or more and a third average current density of 80 mA/cm² or more, to generate an anode exhaust comprising $H_2$, CO, and $CO_2$, and a cathode exhaust comprising a $CO_2$ content of 1.0 vol % or less, an $O_2$ content of 1.0 vol % or more, and an $H_2O$ content of 1.0 vol % or more, the third operating condition further comprising the first anode flow direction and the first cathode flow direction, the third operating condition optionally being substantially the same as the first operating condition.

Alternative Embodiment 13

The method of any of Alternative Embodiments 10 to 12, wherein the calculated $CO_2$ utilization is greater than the first measured $CO_2$ utilization by 5% or more (or 10% or more, or 20% or more).

Alternative Embodiment 14

The method of any of the above alternative embodiments, wherein the cathode comprises a cathode surface (in contact with a cathode collector), the cathode surface comprising an open area of 45% or more, or 50% or more, or 60% or more.

Additional Alternative Embodiment A. A method for producing electricity, the method comprising: introducing an anode input stream (optionally comprising $H_2$) into an anode of a molten carbonate fuel cell; introducing a cathode input stream comprising $O_2$, $CO_2$, and $H_2O$ into a cathode of the molten carbonate fuel cell; operating the molten carbonate fuel cell, for a first time period, at a first operating condition comprising a first measured $CO_2$ utilization of 70% or more and a first average current density of 80 mA/cm² or more, to generate an anode exhaust comprising $H_2$, CO, and $CO_2$, and a cathode exhaust comprising $CO_2$, an $O_2$ content of 1.0 vol % or more, and an $H_2O$ content of 1.0 vol % or more; and operating the molten carbonate fuel cell, for a second time period, at a second operating condition comprising a second $CO_2$ utilization and a second average current density to generate an anode exhaust and a cathode exhaust, the second operating condition comprising one or more of a) the second measured $CO_2$ utilization being 70% or less, b) a cathode input stream having a $CO_2$ concentration of 10 vol % or more, c) the second average current density being lower than the first average current density by 20 mA/cm² or more, and d) a cathode exhaust comprising a $CO_2$ content of 2.0 vol % or more, wherein, during the first time period, a calculated $CO_2$ utilization calculated based on the first average current density is greater than the first measured $CO_2$ utilization by 5.0% or more.

Additional Alternative Embodiment B. A method for producing electricity, the method comprising: introducing an anode input stream (optionally comprising $H_2$) into an anode of a molten carbonate fuel cell along a first anode axis; introducing a cathode input stream comprising $O_2$, $CO_2$, and $H_2O$ into a cathode of the molten carbonate fuel cell along a first cathode axis; operating the molten carbonate fuel cell, for a first time period, at a first operating condition comprising a first measured $CO_2$ utilization of 70% or more and a first average current density of 80 mA/cm² or more, to generate an anode exhaust comprising $H_2$, CO, and $CO_2$, and a cathode exhaust comprising $CO_2$, an $O_2$ content of 1.0 vol % or more, and an $H_2O$ content of 1.0 vol % or more; changing the flow direction of a) the anode input stream to correspond to a second anode axis, b) the cathode input stream to correspond to a second cathode axis, or c) a combination of a) and b); and operating the molten carbonate fuel cell, for a second time period, at a second operating condition comprising a second measured $CO_2$ utilization of 70% or more and a second average current density of 80 mA/cm² or more, to generate an anode exhaust comprising $H_2$, CO, and $CO_2$, and a cathode exhaust comprising $CO_2$, an $O_2$ content of 1.0 vol % or more, and an $H_2O$ content of 1.0 vol % or more, the second operating condition further comprising the changed flow direction, wherein, during the first time period, a calculated $CO_2$ utilization calculated based on the first average current density is greater than the first measured $CO_2$ utilization by 5.0% or more.

All numerical values within the detailed description and the claims herein are modified by "about" or "approximately" the indicated value, and take into account experimental error and variations that would be expected by a person having ordinary skill in the art.

Although the present invention has been described in terms of specific embodiments, it is not necessarily so limited. Suitable alterations/modifications for operation under specific conditions should be apparent to those skilled in the art. It is therefore intended that the following claims be interpreted as covering all such alterations/modifications that fall within the true spirit/scope of the invention.

The invention claimed is:

1. A method for producing electricity, the method comprising:
   operating a molten carbonate fuel cell comprising an anode and a cathode, for a first time period, at a first operating condition comprising a first transference of 0.95 or less and a first average current density of 60 mA/cm$^2$ or more, to generate an anode exhaust comprising $H_2$, CO, and $CO_2$, and a cathode exhaust comprising 2.0 vol % or less $CO_2$, 1.0 vol % or more $O_2$, and 1.0 vol % or more $H_2O$; and
   operating the molten carbonate fuel cell, for a second time period, at a second operating condition comprising a second transference of greater than 0.95 to generate an anode exhaust and a cathode exhaust.

2. The method of claim 1, wherein the first operating condition comprises a first measured $CO_2$ utilization of 75% or more, a cathode input stream having a $CO_2$ concentration of 10 vol % or less, or a combination thereof.

3. The method of claim 1, wherein the second operating condition comprises one or more of a) a second measured $CO_2$ utilization of 70% or less, b) a cathode input stream having a $CO_2$ concentration of 15 vol % or more, c) a second average current density lower than the first average current density by 20 mA/cm$^2$ or more, and d) a cathode exhaust comprising a $CO_2$ content of 2.0 vol % or more.

4. The method of claim 3, wherein operating at the second $CO_2$ utilization of 70% or less comprises increasing a flow rate of the cathode input gas into the cathode while maintaining the first average current density.

5. The method of claim 3, wherein the first operating condition comprises a first flow rate for the cathode input stream, and wherein the second operating condition comprises the first cathode input stream, the first flow rate, and the second average current density.

6. The method of claim 1, wherein the second transference is 0.98 or more.

7. The method of claim 1, further comprising: operating the molten carbonate fuel cell, for a third time period, at a third operating condition comprising a third transference of 0.95 or less and a third average current density of 60 mA/cm$^2$ or more, to generate an anode exhaust comprising $H_2$, CO, and $CO_2$, and a cathode exhaust comprising 2.0 vol % or less $CO_2$, 1.0 vol % or more $O_2$, and 1.0 vol % or more $H_2O$.

8. The method of claim 7, wherein the third operating condition is substantially the same as the first operating condition.

9. The method of claim 1, wherein the first time period and the second time period comprise a cycle period, the first time period comprising 51% or more of the cycle period.

10. The method of claim 1, wherein the first transference is 0.90 or less.

11. The method of claim 1, wherein the first average current density is 150 mA/cm$^2$ or more, or wherein the second average current density is 80 mA/cm$^2$ or more, or a combination thereof.

12. The method of claim 1, wherein the cathode comprises a cathode surface having an open area of 45% or more.

13. The method of claim 1, wherein the first operating condition comprises a cathode input stream comprising 5.0 vol % or less of $CO_2$, or wherein the first operating condition comprises a cathode exhaust comprising 1.0 vol % or less of $CO_2$, or a combination thereof.

14. The method of claim 1, further comprising:
   introducing an anode input stream into the anode of a molten carbonate fuel cell;
   introducing a cathode input stream comprising $O_2$, $CO_2$, and $H_2O$ into the cathode of the molten carbonate fuel cell.

* * * * *